US008330814B2

(12) United States Patent
Matsuda et al.

(10) Patent No.: US 8,330,814 B2

(45) Date of Patent: Dec. 11, 2012

(54) INDIVIDUAL DETECTOR AND A TAILGATE DETECTION DEVICE

(75) Inventors: Hiroshi Matsuda, Hirakata (JP); Hiroyuki Fujii, Daito (JP); Naoya Ruike, Hachinohe (JP)

(73) Assignee: Panasonic Corporation, Osaka (JP)

(*) Notice: Subject to any disclaimer, the term of this patent is extended or adjusted under 35 U.S.C. 154(b) by 1304 days.

(21) Appl. No.: 11/658,869

(22) PCT Filed: Jul. 29, 2005 (Under 37 CFR 1.47)

(86) PCT No.: PCT/JP2005/013928

§ 371 (c)(1), (2), (4) Date: Mar. 17, 2008

(87) PCT Pub. No.: WO2006/011593

PCT Pub. Date: Feb. 2, 2006

(65) Prior Publication Data

US 2009/0167857 A1 Jul. 2, 2009

(30) Foreign Application Priority Data

Jul. 30, 2004 (JP) ................................ 2004-224485

(51) Int. Cl.
*H04N 7/18* (2006.01)

(52) U.S. Cl. ....................................... 348/143; 348/148

(58) Field of Classification Search .................. 348/143, 348/148

See application file for complete search history.

(56) References Cited

U.S. PATENT DOCUMENTS

| | | | | |
|---|---|---|---|---|
| 5,866,887 | A * | 2/1999 | Hashimoto et al. | 235/98 R |
| 6,639,656 | B2 | 10/2003 | Takada et al. | |
| 7,382,895 | B2 * | 6/2008 | Bramblet et al. | 382/103 |
| 2003/0235341 | A1 | 12/2003 | Gokturk et al. | |
| 2004/0153671 | A1 | 8/2004 | Schuyler et al. | |
| 2004/0260513 | A1 * | 12/2004 | Fitzpatrick et al. | 702/182 |
| 2005/0093697 | A1 * | 5/2005 | Nichani et al. | 340/545.1 |
| 2006/0187120 | A1 | 8/2006 | Ohba et al. | |

FOREIGN PATENT DOCUMENTS

| | | |
|---|---|---|
| CN | 1105141 | 7/1995 |
| EP | 0671706 A2 | 9/1995 |

(Continued)

OTHER PUBLICATIONS

Chinese Examination Report, issued in corresponding Chinese Application No. 200580013966.8.

(Continued)

*Primary Examiner* — Wing Chan

*Assistant Examiner* — David X Yi

(74) *Attorney, Agent, or Firm* — Edwards Wildman Palmer LLP; James E. Armstrong, IV; Stephen D. LeBarron

(57) ABSTRACT

An individual detector comprises a range image sensor and an object detection stage. The range image sensor is disposed to face a detection area and generates a range image. When one or more physical objects exist in said area, each image element of the range image includes each distance value up to the one or more physical objects, respectively. Based on the range image generated with the sensor, the object detection stage separately detects the one or more physical objects in the area. Accordingly, it is possible to separately detect one or more physical objects in the detection area without increasing the number of constituent elements for detecting the one or more physical objects.

18 Claims, 15 Drawing Sheets

FOREIGN PATENT DOCUMENTS

| | | |
|---|---|---|
| EP | 1686544 | 8/2006 |
| JP | 2000-230809 | 8/2000 |
| JP | 2002-277239 | 9/2002 |
| JP | 2003-57007 | 2/2003 |
| JP | 2003057007 | 2/2003 |
| JP | 2003-196656 | 7/2003 |
| JP | 2004-124497 | 4/2004 |
| WO | WO-03/088157 | 10/2003 |

OTHER PUBLICATIONS

European Search Report, issued in corresponding European Application No. 05 76 7175.

Office Action dated Jul. 15, 2010, issued for the European Patent Application No. 05 767 175.2.

* cited by examiner

INDIVIDUAL DETECTOR AND A TAILGATE DETECTION DEVICE

TECHNICAL FIELD

The invention relates to individual detectors for separately detecting one or more physical objects in a detection area, and tailgate detection devices equipped with the individual detectors.

BACKGROUND ART

Leading-edge entry/exit management systems make accurate identification possible by utilizing biometric information, but there exists a simple method that slips through even security based on such high-tech. That is, when an individual (e.g., an employee, a resident or the like) authorized by authentication entries through unlocked door, intrusion is allowed by what is called "tailgate" while the door is opened.

A prior art system described in Japanese Patent Publication No. 2004-124497 detects tailgate by calculating the number of persons' three-dimensional silhouettes. The silhouettes are virtually embodied on a computer by the volume intersection method based on the theory that a physical object exists inside a common region (a visual hull) of volume corresponding to two or more viewpoints. That is, the method uses two or more cameras, and virtually projects a two-dimensional silhouette obtained from output of each camera on actual space and then forms a three-dimensional silhouette corresponding to a shape around the whole physical object.

However, in the above system, there is a need to use two or more cameras due to the volume intersection method. The system also captures the face of a person with one of the two cameras, and since the volume intersection method requires putting the detection area (one or more physical objects) in viewrange of each camera, the system cannot form the three-dimensional silhouette while the face or the front is within the viewrange. On account of this, it becomes difficult to follow moving tracks of one or more physical objects in the detection area. Though this issue can be solved by further adding a camera, it results in increase of cost and installation area of the system. In particular, the number of cameras is mightily increased as the number of doors is increased.

Further, the volume intersection method has another issue when a three-dimensional silhouette is formed from overlapping physical objects because it is not technology for separating the overlapping physical objects. By using reference size corresponding to one physical object, the prior art system can detect a state that two or more physical objects are overlapping, but the system cannot distinguish a state that a person and a baggage are overlapping from a state that two or more persons are overlapping. The former does not need to give the alarm, whereas the latter needs to give the alarm. In addition, the prior art system removes noise by calculating differentials between a previously recorded background image and a present image, but even though it is possible to remove a static physical object(s) (hereinafter referred to as "static noise") such as a wall, a plant, etc, the system cannot remove a dynamic physical object(s) (hereinafter referred to as "dynamic noise") such as a baggage, a cart, etc.

DISCLOSURE OF THE INVENTION

It is therefore a first object of the present invention to separately detect one or more physical objects in a detection area without increasing the number of constituent elements for detecting one or more physical objects.

A second object of the present invention is to distinguish a state that a person and dynamic noise are overlapping from a state that two or more persons are overlapping.

An individual detector of the present invention comprises a range image sensor and an object detection stage. The range image sensor is disposed to face a detection area and generates a range image. When one or more physical objects exist in the area, each image element of the range image includes each distance value up to the one or more physical objects, respectively. Based on the range image generated with the sensor, the object detection stage separately detects the one or more physical objects in the area.

In this structure, since one or more physical objects in the detection area are separately detected based on the range image generated with the sensor, the one or more physical objects in the area can be separately detected without increasing the number of constituent elements (sensors) for detecting one or more physical objects.

In an alternate embodiment of the invention, the range image sensor is disposed to face downward to the detection area below. The object detection stage separately detects one or more physical objects to be detected in the area based on data of part in a specific or each altitude of the one or more physical objects to be detected, which is obtained from the range image.

In this structure, for example, it is possible to detect part of physical objects in such altitudes as dynamic noise does not appear, or to detect prescribed part of each physical object to be detected. As a result, a state of overlapping of a person with dynamic noise can be distinguished from a state of overlapping of two or more persons.

In another alternate embodiment of the invention, the object detection stage generates a foreground range image based on differentials between a background range image that is a range image previously obtained from the sensor and a present range image obtained from the sensor, and separately detects one or more persons as the one or more physical objects to be detected in the area based on the foreground range image. According to this invention, since the foreground range image does not include static noise, static noise can be removed.

In other alternate embodiment of the invention, the object detection stage generates the foreground range image by extracting a specific image element from each image element of the present range image. The specific image element is extracted when a distance differential is larger than a prescribed distance threshold value, where the distance differential is obtained to subtract an image element of the present range image from a corresponding image element of the background range image.

In this structure, since it is possible to remove one or more physical objects that exist more backward than the position forward by distance corresponding to the prescribed distance threshold value from the position corresponding to the background range image, dynamic noise (e.g., a baggage, a cart, etc.) is removed when the prescribed distance threshold value is set to a proper value. As a result, a state of overlapping of a person with dynamic noise can be distinguished from a state of overlapping of two or more persons.

In other alternate embodiment of the invention, the range image sensor has a camera structure constructed with an optical system and a two-dimensional photosensitive array disposed to face the detection area via the optical system. Based on camera calibration data previously recorded with respect to the range image sensor, the object detection stage converts a camera coordinate system of the foreground range image depending on the camera structure into an orthogonal coordinate system, and thereby generates an orthogonal coordinate conversion image that represents each position of presence/unpresence of said physical objects.

In other alternate embodiment of the invention, the object detection stage converts the orthogonal coordinate system of the orthogonal coordinate conversion image into a world coordinate system virtually set on the real space, and thereby generates a world coordinate conversion image that represents each position of presence/unpresence of said physical objects as actual position and actual dimension.

In this structure, the orthogonal coordinate system of the orthogonal coordinate conversion image is converted into the world coordinate system, for example, by rotation, parallel translation and so on based on data such as depression angle, position of the sensor and so on, so that it is possible to deal with data of one or more physical objects in the world coordinate conversion image as actual position and actual dimension (distance, size).

In other alternate embodiment of the invention, the object detection stage projects the world coordinate conversion image on a prescribed plane by parallel projection to generate a parallel projection image constituted of each image element seen from the prescribed plane in the world coordinate conversion image.

In this structure, it is possible to reduce data amount of the world coordinate conversion image by generating the parallel projection image. In addition, for example, when the plane is a horizontal plane on the ceiling side, data of one or more persons to be detected can be separately extracted from the parallel projection image. When the plane is a vertical plane, a two-dimensional silhouette of side face of each person can be obtained from the parallel projection image, and therefore if a pattern corresponding to the silhouette is used, a person(s) can be detected based on the parallel projection image.

In other alternate embodiment of the invention, the object detection stage extracts sampling data corresponding to part of one or more physical objects from the world coordinate conversion image, and identifies whether or not the data corresponds to reference data previously recorded based on region of a person to distinguish whether a physical object(s) corresponding to the sampling data is(are) a person(s) or not, respectively.

In this structure, since the reference data substantially functions as data with a person feature in the world coordinate conversion image from which static noise and dynamic noise (e.g., a baggage, a cart, etc.) are removed, it is possible to separately detect one or more persons in the detection area.

In other alternate embodiment of the invention, the object detection stage extracts sampling data corresponding to part of one or more physical objects from the parallel projection image, and identifies whether or not the data corresponds to reference data previously recorded based on region of a person to distinguish whether a physical object(s) corresponding to the sampling data is(are) a person(s) or not, respectively.

In this structure, since the reference data of region (outline) of a person substantially functions as data with a person feature in the parallel projection image from which static noise and dynamic noise (e.g., a baggage, a cart, etc.) are removed, it is possible to separately detect one or more persons in the detection area.

In other alternate embodiment of the invention, the sampling data comprises volume or ratio of width, depth and height of part of one or more physical objects virtually represented in the world coordinate conversion image. The reference data is previously recorded based on region of one or more persons, and is a value or value range with regard to volume or ratio of width, depth and height of said region. According to this invention, it is possible to detect the number of persons in the detection area.

In other alternate embodiment of the invention, the sampling data comprises area or ratio of width and depth of part of one or more physical objects virtually represented in the parallel projection image. The reference data is previously recorded based on region of one or more persons, and is a value or value range with regard to area or ratio of width and depth of said region. According to this invention, it is possible to detect the number of persons in the detection area.

In other alternate embodiment of the invention, the sampling data comprises three-dimensional pattern of part of one or more physical objects virtually represented in the world coordinate conversion image. The reference data is at least one three-dimensional pattern previously recorded based on region of one or more persons.

In this structure, for example, by selecting and setting a three-dimensional pattern from person's shoulders to the head for the reference data, it is possible to detect the number of persons in the detection area and also eliminate the influence of person's moving hands. Moreover, by selecting and setting a three-dimensional pattern of a person's head for the reference data, one or more persons can be separately detected regardless of each person's physique.

In other alternate embodiment of the invention, the sampling data comprises two-dimensional pattern of part of one or more physical objects virtually represented in the parallel projection image. The reference data is at least one two-dimensional pattern previously recorded based on region of one or more persons.

In this structure, for example, by selecting and setting at least one two-dimensional outline pattern between person's shoulders and the head for the reference data, it is possible to detect the number of persons in the detection area, and also eliminate the influence of person's moving hands. Moreover, by selecting and setting a two-dimensional outline pattern of a person's head for the reference data, one or more persons can be separately detected regardless of each person's physique.

In other alternate embodiment of the invention, the range image sensor further comprises a light source that emits intensity-modulated light toward the detection area, and generates an intensity image in addition to the range image based on received light intensity per image element. The object detection stage extracts sampling data corresponding to part of one or more physical objects based on the orthogonal coordinate conversion image, and distinguishes whether or not there is(are) a lower part(s) than prescribed intensity at part of a physical object(s) corresponding to the sampling data based on the intensity image. In this structure, it is possible to detect part of a physical object(s) lower than the prescribed intensity.

In other alternate embodiment of the invention, the range image sensor further comprises a light source that emits intensity-modulated infrared light toward the detection area, and generates an intensity image of the infrared light in addition to the range image based on the infrared light from the area. The object detection stage extracts sampling data corresponding to part of one or more physical objects based on the world coordinate conversion image, and identifies whether or not average intensity of the infrared light from part of each physical object corresponding to the sampling data is lower than prescribed intensity based on the intensity image to distinguish whether part of each physical object corresponding to the sampling data is a person's head or not, respectively. In this structure, since reflectance of hair on a person's head with respect to the infrared light is usually lower than that of person's shoulders side, a person's head can be detected.

In other alternate embodiment of the invention, the object detection stage assigns position of part of each physical object distinguished as a person in the parallel projection image to component of a cluster based on the number of physical objects distinguished as persons, and then verifies the number of physical objects based on divided domains obtained by K-means algorithm of clustering. In this structure, it is possible to verify the number of physical objects distinguished as persons, and moreover positions of persons can be estimated.

In other alternate embodiment of the invention, the object detection stage generates a foreground range image by extracting a specific image element from each image element of the range image, and separately detects one or more persons as one or more physical objects to be detected in the area based on the foreground range image. The specific image element is extracted when a distance value of an image element of the range image is smaller than a prescribed distance threshold value.

In this structure, since it is possible to detect physical objects between a position of the range image sensor and a forward position (distance corresponding to the prescribed distance threshold value) away from the sensor, a state of overlapping of a person with dynamic noise (e.g., a baggage, a cart, etc.) can be distinguished from a state of overlapping of two or more persons when the prescribed distance threshold value is set to a proper value.

In other alternate embodiment of the invention, the object detection stage identifies whether or not a range image around an image element with a minimum value of distance value distribution of the range image corresponds to a specific shape and size of the specific shape previously recorded based on region of a person, and then distinguishes whether a physical object(s) corresponding to the range image around the image element with the minimum value is(are) a person(s) or not, respectively.

In this structure, it is possible to distinguish a state that a person and dynamic noise (e.g., a baggage, a cart, etc.) are overlapping from a state that two or more persons are overlapping.

In other alternate embodiment of the invention, the object detection stage generates a distribution image from each distance value of the range image, and separately detects one or more physical objects in the detection area based on the distribution image. The distribution image includes one or more distribution domains when one or more physical objects exist in the detection area. The distribution domain is formed from each image element with a distance value lower than a prescribed distance threshold value in the range image. The prescribed distance threshold value is obtained to add a prescribed distance value to the minimum value of each distance value of the range image.

In this structure, since it is possible to detect one or more persons' heads to be detected in the detection area, a state of overlapping of a person with the dynamic noise (e.g., a baggage, a cart, etc.) can be distinguished from a state of overlapping of two or more persons.

A tailgate detection device of the present invention comprises said individual detector and a tailgate detection stage. The range image sensor continuously generates said range image. On tailgate alert, the tailgate detection stage separately follows moving tracks of one or more persons detected with the object detection stage. And when two or more persons move to/from the detection area on prescribed direction, the tailgate detection stage detects occurrence of tailgate to transmit an alarm signal.

In this structure, since an alarm signal is transmitted when two or more persons move to/from the detection area on prescribed direction, tailgate can be prevented. In addition, even if plural persons are detected, an alarm signal is not transmitted when two or more persons do not move to/from the detection area on prescribed direction, and therefore a false alarm can be prevented.

Another tailgate detection device of the present invention comprises said individual detector and a tailgate detection stage. The range image sensor continuously generates said range image. The tailgate detection stage monitors entry and exit of one or more persons detected with the object detection stage and each direction of the entry and exit. And when two or more persons move to/from said detection area on prescribed direction within a prescribed time set for tailgate guard, the tailgate detection stage detects occurrence of tailgate to transmit an alarm signal.

In this structure, since an alarm signal is transmitted when two or more persons move to/from the detection area on prescribed direction, tailgate can be prevented. Moreover, even if plural persons are detected, an alarm signal is not transmitted when two or more persons do not move to/from the detection area on prescribed direction, and therefore a false alarm can be prevented.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
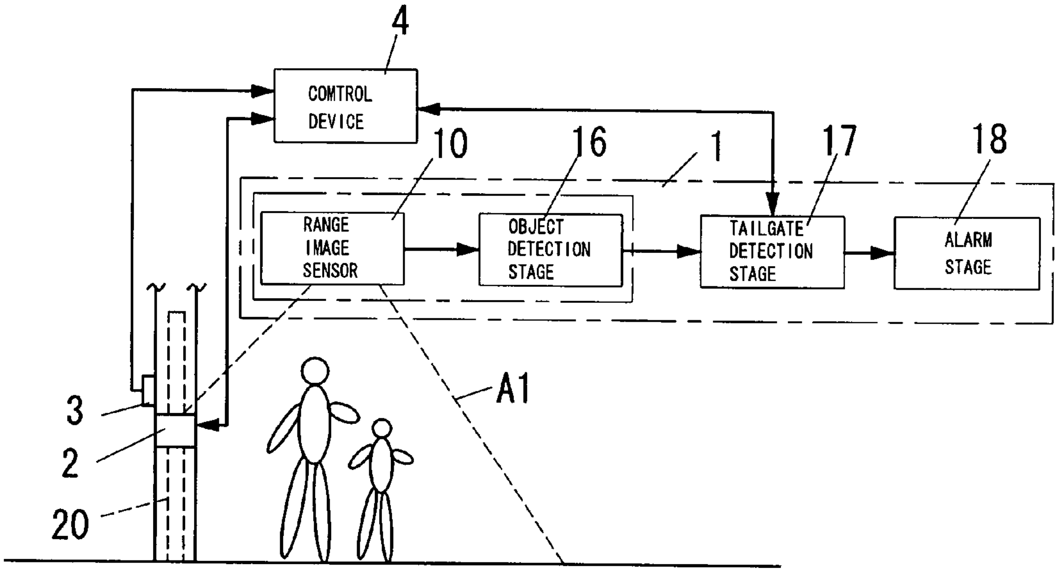
FIG. 1 shows a management system equipped with a first embodiment of a tailgate detection device according to the invention.

FIG. 1 shows a management system equipped with a first embodiment of a tailgate detection device according to the invention.

Figure 2:
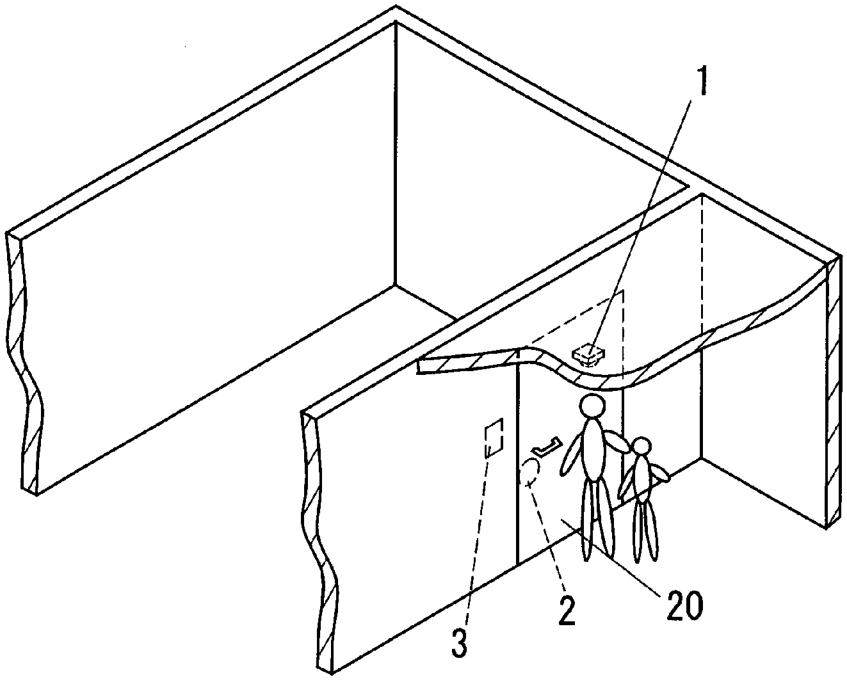
FIG. 2 shows proximity to door of a room to be managed by the management system of FIG. 1.

The management system as shown in FIGS. 1 and 2 comprises at least one tailgate detection device 1, a security device 2 and at least an input device 3 at every door 20 of the room to be managed, and also comprises a control device 4 that communicates with each tailgate detection device 1, each security device 2 and each input device 3. However, not limited to the entry management system, a management system of the present invention may be an entry/exit management system.

The security device 2 is an electronic lock that has an auto lock function and unlocks the door 20 in accordance with an unlock control signal from the control device 4. After locking the door 20, the electronic lock transmits a close notice signal to the control device 4.

In an alternate example, the security device 2 is an open/close control device in an automatic door system. The open/close control device opens or closes the door 20 in accordance with an open or close control signal from the control device 4, respectively. After closing the door 20, the device transmits a close notice signal to the control device 4.

The input device 3 is a card reader that is located on a neighboring wall outside the door 20 and reads out ID information of an ID card to transmit it to the control device 4. In case that the management system is the entry/exit management system, another input device 3, for example, a card reader is also located on a wall of a room to be managed inside the door 20.

The control device 4 is constructed with a CPU, a storage device storing each previously registered ID information, program and so on, etc, and executes the whole control of the system.

For example, when ID information from an input device 3 agrees with ID information previously stored in the storage device, the device 4 transmits the unlock control signal to a corresponding security device 2, and also transmits an entry permission signal to a corresponding tailgate detection device 1. Further, when receiving the close notice signal from a security device 2, the device 4 transmits an entry prohibition signal to a corresponding tailgate detection device 1.

In the alternate example in which the security device 2 is the open/close control device, when ID information from an input device 3 agrees with ID information stored in the storage device, the device 4 transmits the open control signal to a corresponding open/close control device and transmits the close control signal to the corresponding open/close control device after prescribed time. Also, when receiving the close notice signal from an open/close control device, the device 4 transmits the entry prohibition signal to a corresponding tailgate detection device 1.

In addition, when receiving an alarm signal from a tailgate detection device 1, the device 4 executes a prescribed process such as, for example, a notification to the administrator, extension of operation time of camera (not shown) and so on. After receiving the alarm signal, if prescribed release procedures are performed or a prescribed time passes, the device 4 transmits a release signal to the corresponding tailgate detection device 1.

The tailgate detection device 1 comprises an individual detector constructed with a range image sensor 10 and an object detection stage 16, a tailgate detection stage 17 and an alarm stage 18. The object detection stage 16 and the tailgate detection stage 17 are comprised of a CPU, a storage device storing program and so on, etc.

Figure 3:
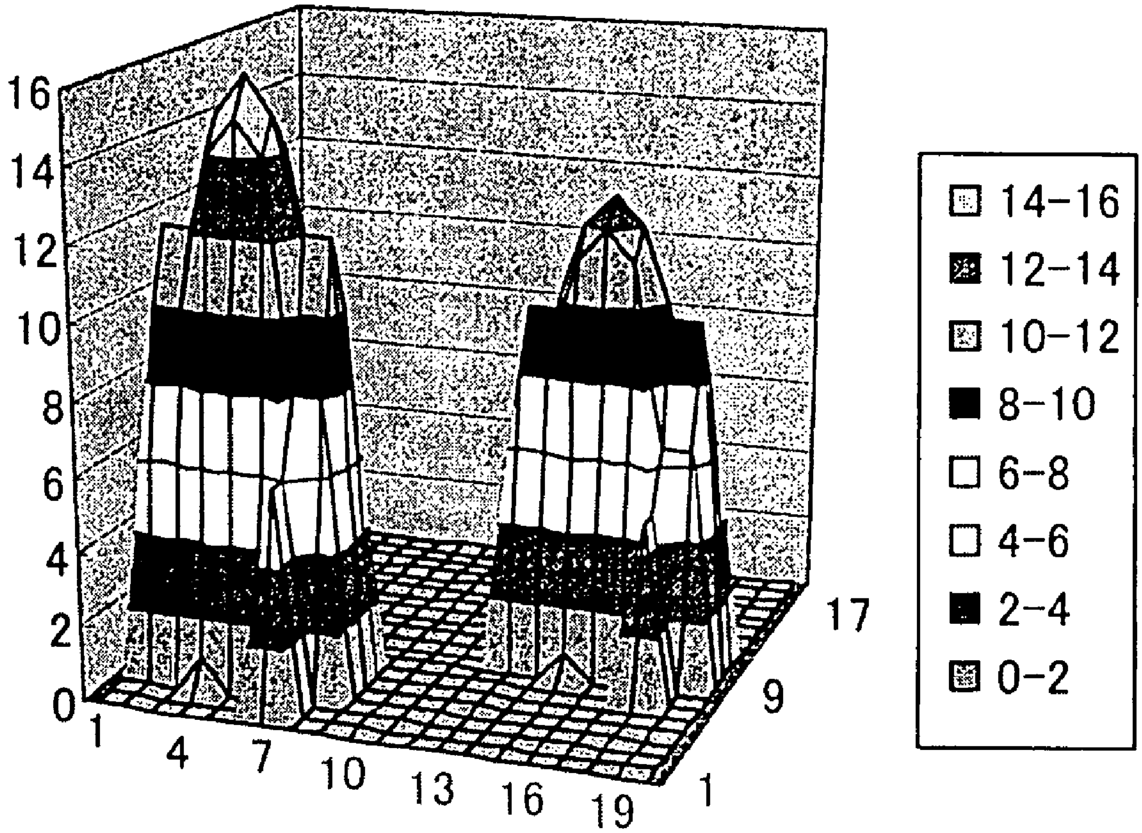
FIG. 3 is development to three-dimensions of each image element of a range image or a foreground range image obtained from a range image sensor of the tailgate detection device.
Figure 4A:
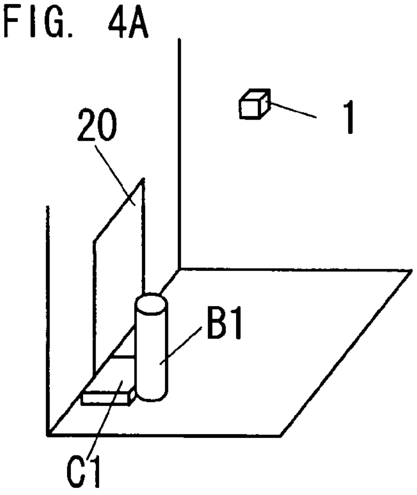
FIG. 4A shows an example of a state in a detection area.
Figure 4B:
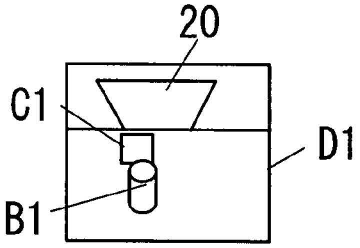
FIG. 4B shows a range image of FIG. 4A.

The range image sensor 10 is disposed to face downward to a detection area A1 below and continuously generates range images. When one or more physical objects exist in the area A1, each image element of a range image respectively includes each distance value up to the one or more physical objects as shown in FIG. 3. For example, when a person B1 and a cart C1 exist in the detection area, the range image D1 as shown in FIG. 4B is obtained.

In the first embodiment, the sensor 10 includes a light source (not shown) that emits intensity-modulated infrared light toward the area A1, and has a camera structure (not shown) constructed with an optical system with a lens, an infrared light transmission filter and so on, and a two-dimensional photosensitive array disposed to face the area A1 via the optical system. Further, based on the infrared light from the area A1, the sensor 10 having the camera structure generates an intensity image of the infrared light in addition to the range image.

The object detection stage 16 separately detects one or more persons as one or more physical objects to be detected in the area A1 based on part (region) in a specific or each altitude of the one or more persons to be detected, which is obtained from the range image generated with the sensor 10. Accordingly, the object detection stage 16 executes each process, as follows.

Figure 4C:
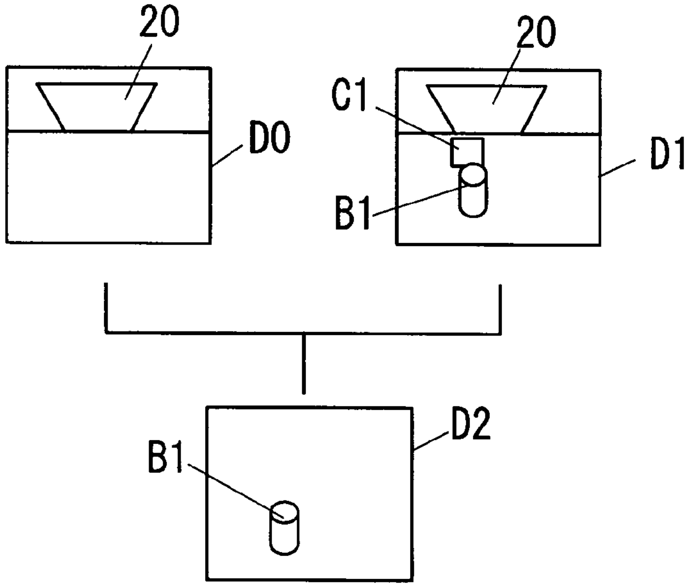
FIG. 4C shows a foreground range image generated from the range image of FIG. 4B.

In a first process, as shown in FIG. 4C, the object detection stage 16 generates a foreground range image D2 based on differentials between a background range image D0 that is a range image previously obtained from the sensor 10 and a present range image D1 obtained from the sensor 10. The background range image D0 is captured with the door 20 closed. Besides, the background range image may include average distance values on time and space directions in order to suppress dispersion in distance values.

Further expanding on the first process, the foreground range image is generated by extracting a specific image element from each image element of the present range image. The specific image element is extracted when a distance differential obtained to subtract an image element of the present range image from a corresponding image element of the background range image is larger than a prescribed distance threshold value. In this case, since the foreground range image does not include static noise, static noise is removed. In addition, since it is possible to remove one or more physical objects that exist more backward than the position forward by distance corresponding to the prescribed distance threshold value from the position corresponding to the background range image, the cart C1 as dynamic noise is removed as shown in FIG. 4C when the prescribed distance threshold value is set to a proper value. Further, even if the door 20 is opened, physical objects behind the door 20 are removed as well. Therefore, a state of overlapping of a person with dynamic noise (the cart C1, physical objects behind the door 20, etc.) can be distinguished from a state of overlapping of two or more persons.

Figure 5:
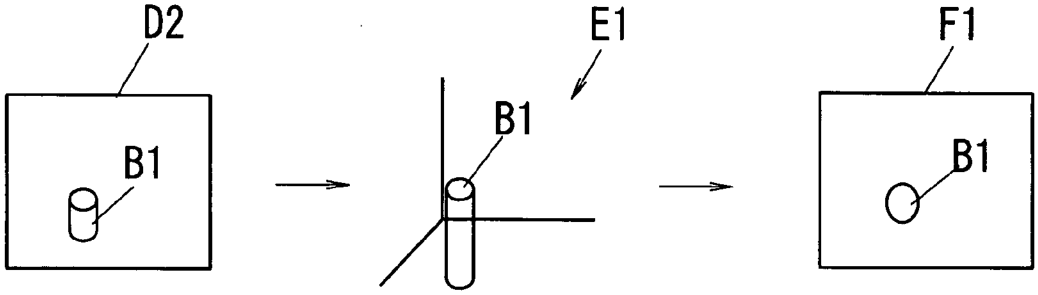
FIG. 5 shows an orthogonal coordinate conversion image and a parallel projection image generated from the foreground range image.

In a second process, as shown in FIG. 5, the object detection stage 16 converts a camera coordinate system of the foreground range image D2 depending on the camera structure into a three-dimensional orthogonal coordinate system (x, y, z) based on camera calibration data (e.g., picture element pitch, lens deformation and so on) previously recorded with respect to the sensor 10. Thereby, the stage 16 generates an orthogonal coordinate conversion image E1 that represents each position of presence/unpresence of physical objects. That is, each image element (xi, xj, xk) of the orthogonal coordinate conversion image E1 is represented by "TRUE" or "FALSE", where "TRUE" shows presence of a physical object and "FALSE" shows unpresence thereof.

In an alternate example of the second process, in case that an image element of the foreground range image corresponds to "TRUE", if a value of the image element is smaller than a threshold value of a variable altitude, "FALSE" is put in an image element of the orthogonal coordinate conversion image corresponding to the image element. Accordingly, it is possible to adaptively remove dynamic noise lower than the altitude of the threshold value of the variable altitude.

In a third process, the object detection stage 16 converts the orthogonal coordinate system of the orthogonal coordinate conversion image into a three-dimensional world coordinate system virtually set on the real space by rotation, parallel translation and so on based on previously recorded camera calibration data (e.g., actual distance of picture element pitch, depression angle, position of the sensor 10 and so on). Thereby, the stage 16 generates a world coordinate conversion image that represents each position of presence/unpresence of physical objects as actual position and actual dimension. In this case, it is possible to deal with data of one or more physical objects in the world coordinate conversion image as actual position and actual dimension (distance, size).

In a fourth process, the object detection stage 16 projects the world coordinate conversion image on a prescribed plane such as a horizontal plane, a vertical plane or the like by parallel projection. Thereby, the stage 16 generates a parallel projection image constituted of each image element seen from the prescribed plane in the world coordinate conversion image. In the first embodiment, as shown in FIG. 5, the parallel projection image F1 is constituted of each image element seen from a horizontal plane on the ceiling side, and each image element showing physical objects to be detected exists at the position of the maximum altitude.

Figure 6:
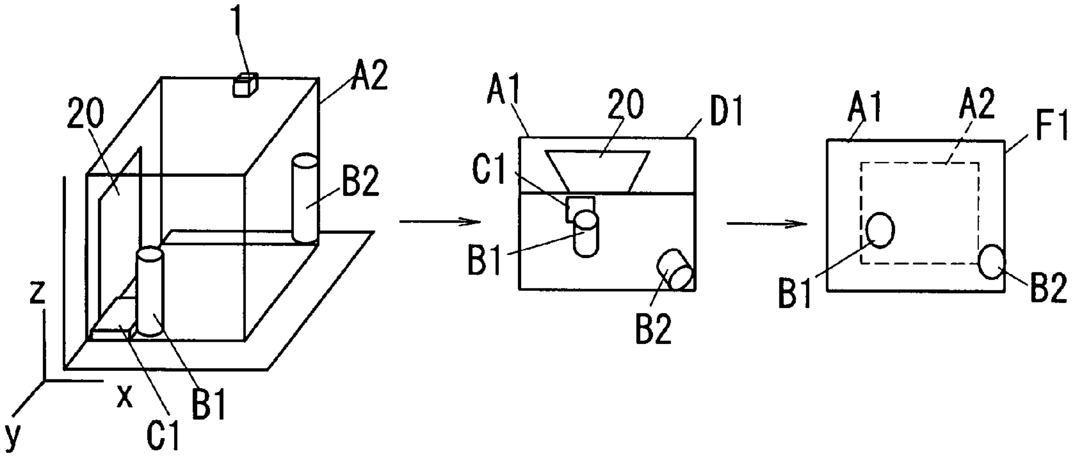
FIG. 6 shows each region extracted from a parallel projection image.

In a fifth process, as shown in FIG. 6, the object detection stage 16 extracts sampling data corresponding to part (Blob) of one or more physical objects within an object extraction area A2 from the parallel projection image F1 and then performs labeling task. And then the stage 16 specifies a position(s) (e.g., a centroidal position(s)) of the sampling data (part of a physical object(s)). In case that sampling data overlaps on the border of the area A2, the stage may process so that the data belongs to the area that is large in area of areas inside and outside the area A2. In the example of FIG. 6, sampling data corresponding to the person B2 outside the area A2 is excluded. In this case, since only part of a physical object(s) within the object extraction area A2 can be extracted, it is possible to remove dynamic noise caused by, for example, reflection into glass doors or the like, and also individual detection suitable for rooms to be managed is possible.

A sixth process and a seventh process are then executed in parallel. In the sixth and seventh processes, the object detection stage 16 identifies whether or not sampling data extracted in the fifth process corresponds to reference data previously recorded based on region of one or more persons to distinguish whether each physical object corresponding to the sampling data is a person or not, respectively.

Figure 7A:
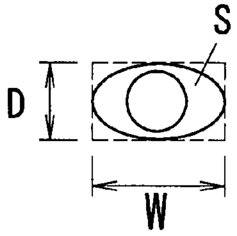
FIG. 7A shows an example of the extracted region of FIG. 6.
Figure 7B:
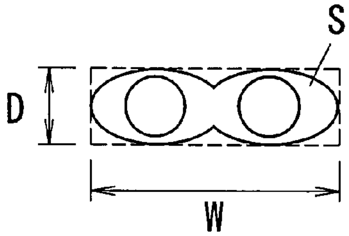
FIG. 7B shows an example of the extracted region of FIG. 6.

In the sixth process, as shown in FIGS. 7A and 7B, sampling data comprises area S or ratio of width and depth of part of one or more physical objects virtually represented in the parallel projection image. The ratio is ratio (W:D) of width W and depth D of a circumscribed square including part of a physical object(s). The reference data is previously recorded based on region of one or more persons, and is a value or value range with regard to area or ratio of width and depth of the region. Accordingly, it is possible to detect the number of persons within the object extraction area A2 in the detection area A1.

Figure 8A:
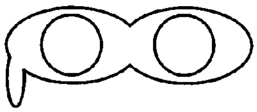
FIG. 8A shows an example of the extracted region of FIG. 6.
Figure 8B:
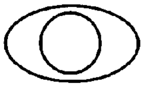
FIG. 8B shows an example of a previously recorded pattern.
Figure 8C:
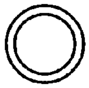
FIG. 8C shows another example of a previously recorded pattern.

In the seventh process, as shown in FIG. 8A, sampling data comprises two-dimensional pattern of part of one or more physical objects virtually represented in the parallel projection image. The reference data is at least one two-dimensional pattern previously recorded based on region of one or more persons as shown in FIGS. 8B and 8C. In the first embodiment, patterns as shown in FIGS. 8B and 8C are utilized, and if a correlation value obtained by pattern matching is larger than a prescribed value, the number of persons corresponding to the patterns is added. Accordingly, for example, by selecting and setting each pattern between person's shoulders and the head for the reference data, it is possible to detect the number of persons in the detection area and also eliminate the influence of person's moving hands. Moreover, by selecting and setting a two-dimensional outline pattern of a person's head for the reference data, one or more persons can be separately detected regardless of each person's physique.

In the first embodiment, when the number of persons calculated in the sixth process is the same as that in the seventh process, the following process is returned to the first process.

On the other hand, when both of them are different, eighth to eleventh processes are further executed.

Figure 9:
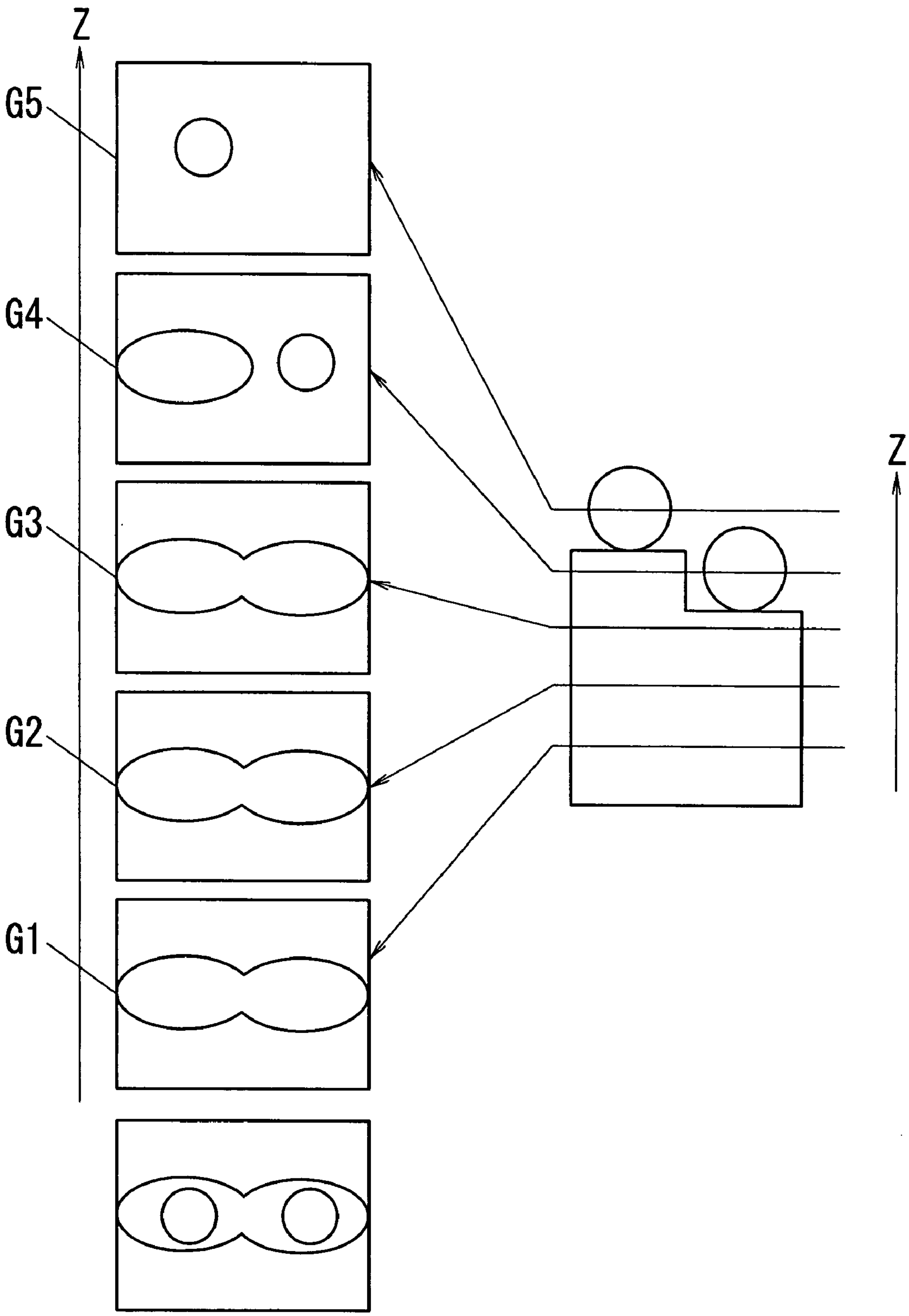
FIG. 9 shows each horizontal section image obtained from a three-dimensional orthogonal-coordinate conversion image or a three-dimensional world coordinate conversion image.

In the eighth process, the object detection stage 16 generates a cross section image by extracting each image element on a prescribed plane from each image element of the three-dimensional orthogonal coordinate conversion image or the three-dimensional world coordinate conversion image. As shown in FIG. 9, each image element on a horizontal plane is extracted at every altitude (e.g., 10 cm) upward from the altitude of the distance threshold value in the first process, and thereby horizontal cross section images G1-G5 are generated. And whenever a horizontal cross section image is generated, the object detection stage 16 extracts and stores sampling data corresponding to part of one or more physical objects from the horizontal cross section image.

In the ninth process, the object detection stage 16 identifies whether or not sampling data extracted in the eighth process corresponds to reference data previously recorded based on region of one or more persons to distinguish whether each physical object corresponding to the sampling data is a person or not, respectively. Sampling data is cross section of part of one or more physical objects virtually represented in a horizontal cross section image. The reference data is a value or value range with regard to cross section of head of one or more persons. Whenever a horizontal cross section image is generated, the object detection stage 16 identifies whether or not sampling data becomes smaller than the reference data. When sampling data becomes smaller than the reference data (G4 and G5), the stage counts the sampling data on the maximum altitude as data corresponding to a person's head.

In the tenth process, whenever a horizontal cross section image is generated after altitude of a horizontal cross section image reaches a prescribed altitude, the object detection stage 16 identifies whether or not average intensity of infrared light from part of each physical object corresponding to sampling data is lower than prescribed intensity, and then distinguishes whether or not part of each physical object corresponding to the sampling data is a person's head, respectively. When part of a physical object(s) corresponding to sampling data is(are) a person-head(s), the sampling data is counted as data corresponding to a person-head(s). Since reflectance of hair on a person's head with respect to infrared light is usually lower than that of a person's shoulders side, a person's head can be detected when the prescribed intensity is set to a proper value.

Figure 10A:
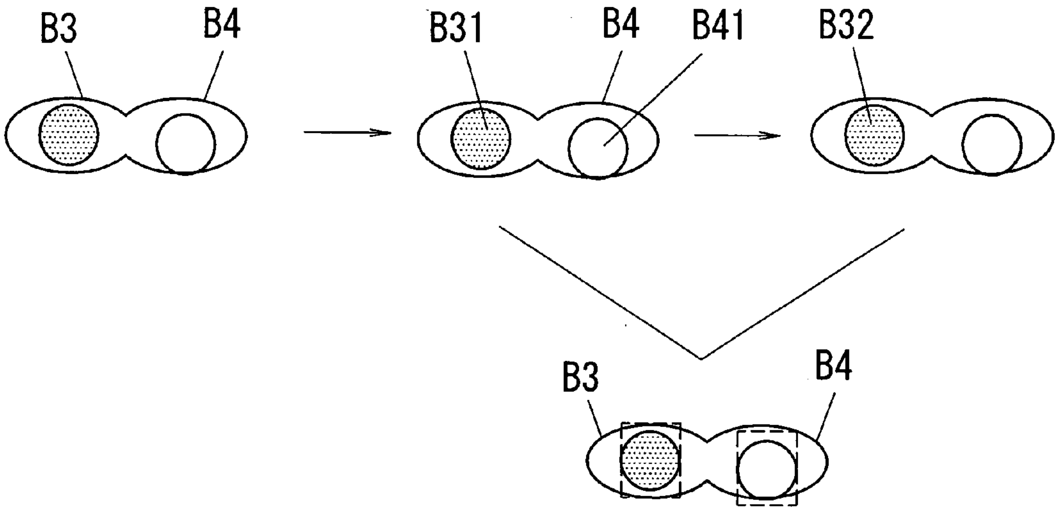
FIG. 10A shows positions of heads detected based on a cross section of head and hair on head.
Figure 10B:
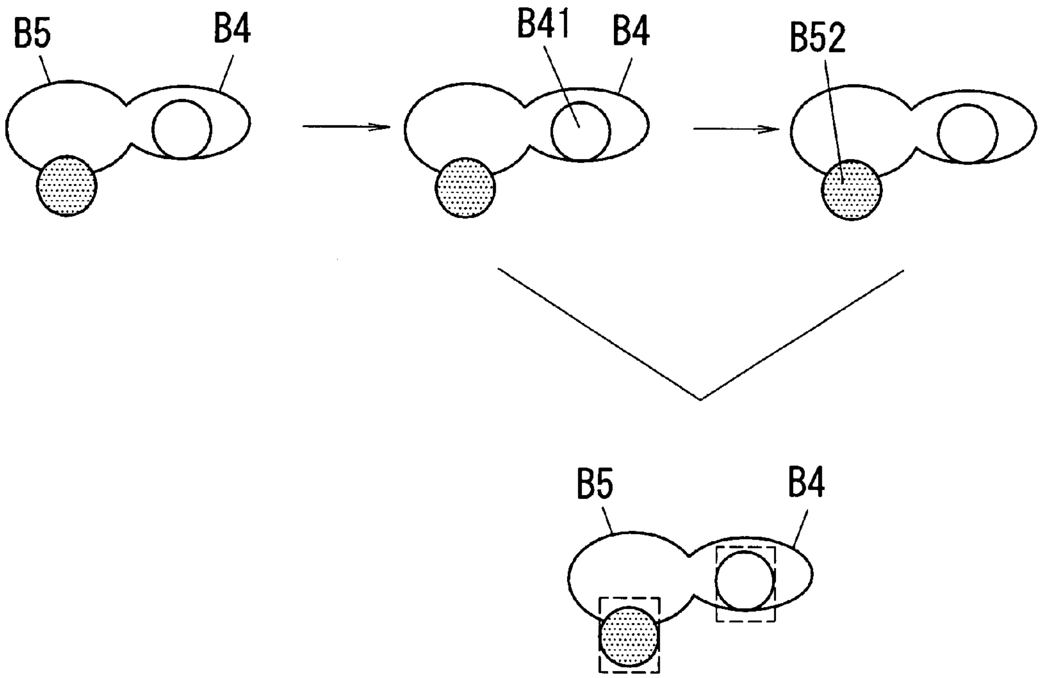
FIG. 10B shows positions of heads detected based on a cross section of head and hair on head.

In the eleventh process, as shown in FIG. 10A, if a position B31 of the head of a person B3 in the maximum altitude distinguished in the ninth process as well as a position B32 of the head of a person B3 distinguished in the tenth process are the same as each other, the object detection stage 16 judges that the person B3 stands up straight and has hair on the head. Otherwise, as shown in FIGS. 10A and 10B, if a position B41 of the head of a person B4 in the maximum altitude is distinguished by only the ninth process, the object detection stage 16 judges that the person B4 stands up straight and has no hair on the head or has one's hat on. As shown in FIG. 10B, if a position B52 of the head of a person B5 is distinguished by only the tenth process, the stage judges that the person B5 leans one's head and has hair on the head. The object detection stage 16 then totals the number of persons.

The tailgate detection stage 17 of FIG. 1 detects whether or not tailgate occurs based on the number of persons detected through the object detection stage 16 after receiving the entry permission signal from the control device 4. In the first embodiment, if the number of persons detected through the object detection stage 16 is two or more, the tailgate detection stage 17 detects occurrence of tailgate to transmit the alarm signal to the device 4 and the alarm stage 18 till receiving the release signal from the device 4. In addition, if the tailgate detection stage 17 is not transmitting the alarm signal to the device 4 and the alarm stage 18, the stage shifts to a stand-by mode after receiving the entry prohibition signal from the control device 4. The alarm stage 18 gives an alarm while receiving the alarm signal from the tailgate detection stage 17.

The operation of the first embodiment is now explained. In the stand-by mode, when the input device 3 reads ID information of an ID card, the device 3 transmits the ID information to the control device 4. The device 4 then certifies whether or not the ID information agrees with previously recorded ID information. When both of them agree with each other, the device 4 transmits the entry permission signal and the unlock control signal to the corresponding tailgate detection device 1 and the corresponding security device 2, respectively. Accordingly, the person carrying the ID card can open the door 20 to enter the room to be managed.

Figure 11:
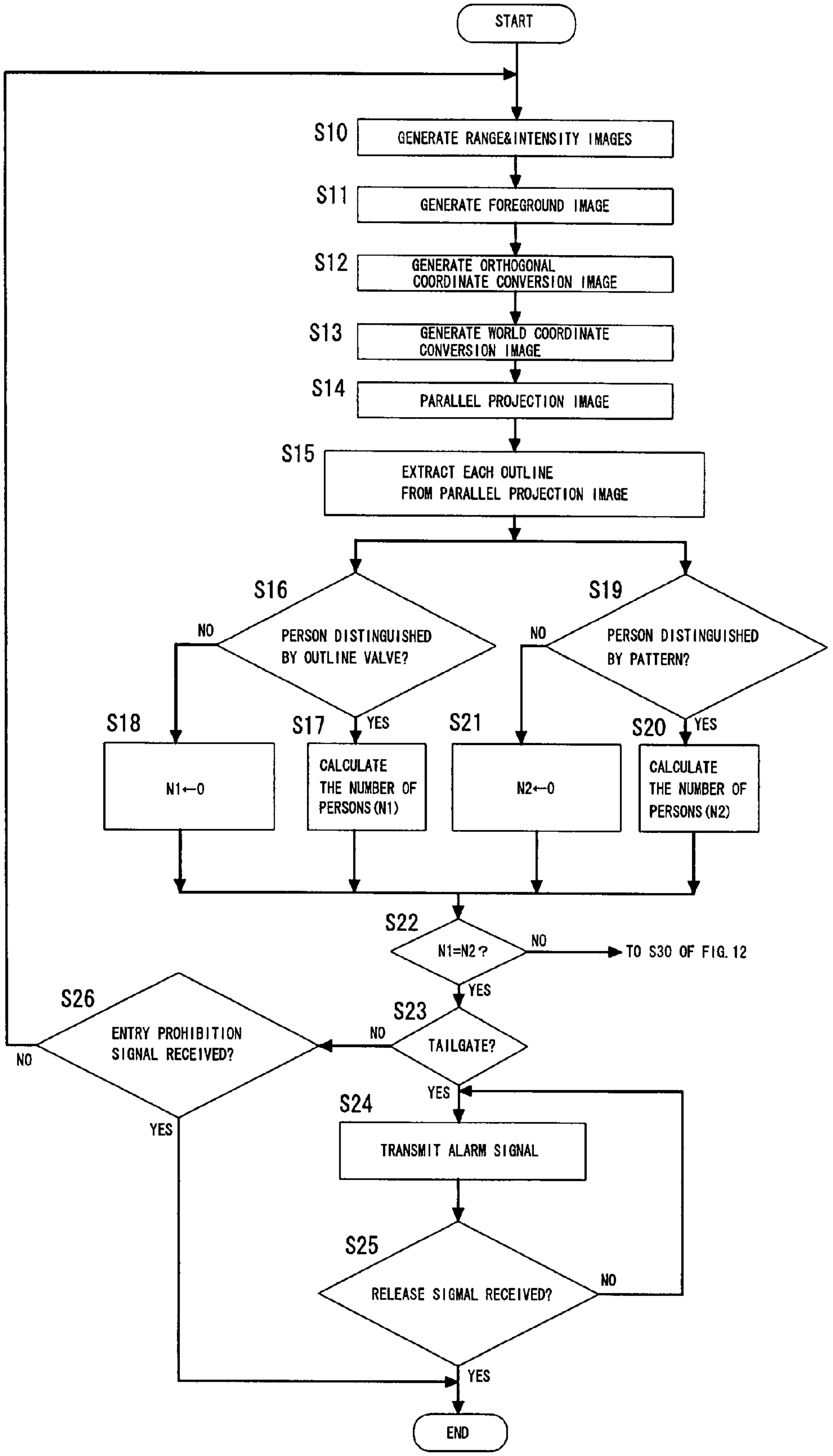
FIG. 11 is a flow chart executed by a CPU that forms an object detection stage and a tailgate detection stage.
Figure 12:
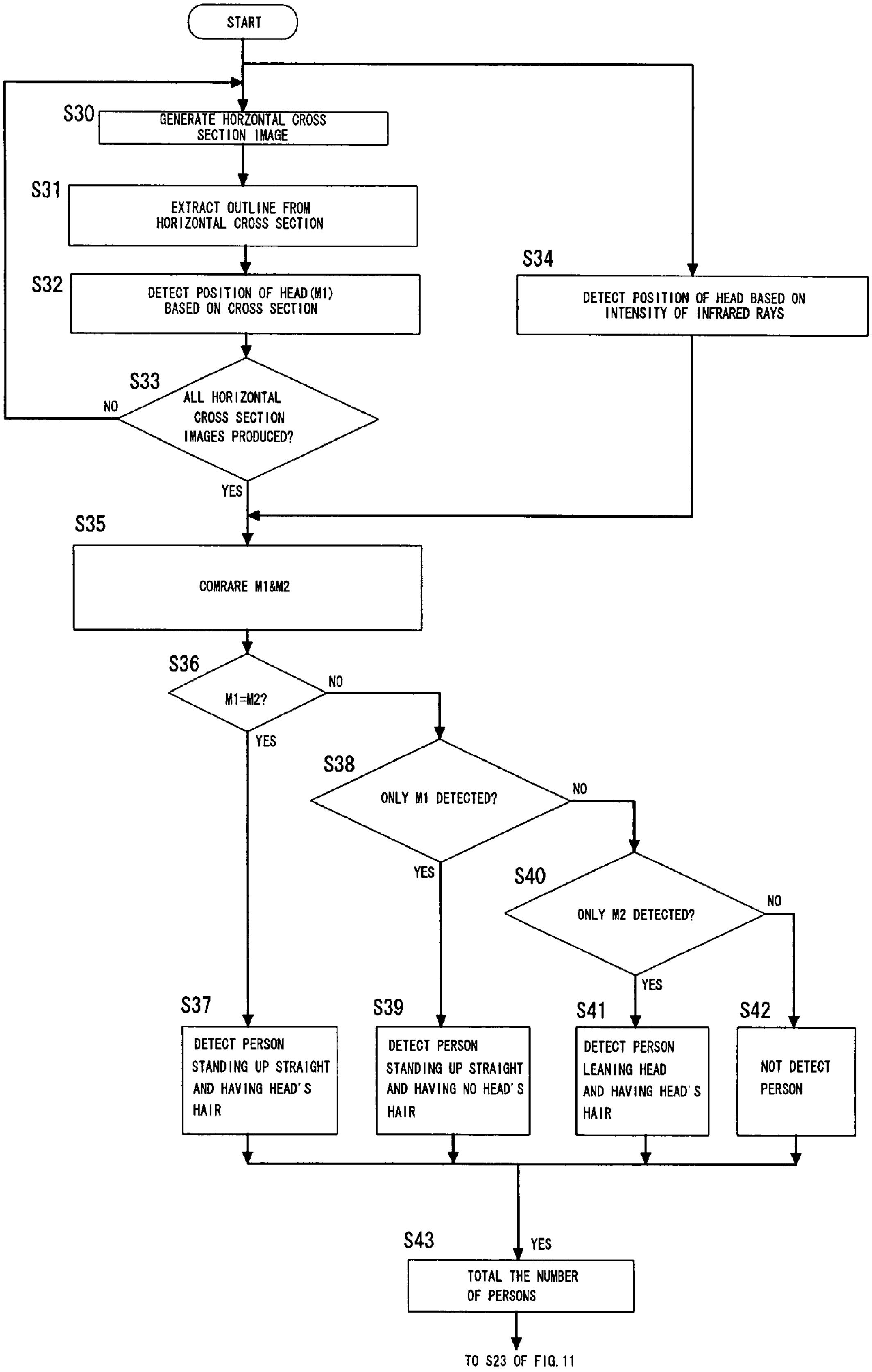
FIG. 12 is a flow chart executed by the CPU.

The operation after the tailgate detection device 1 receives the entry permission signal from the control device 4 is explained referring to FIGS. 11 and 12. In the tailgate detection device 1, a range image and an intensity image of infrared light are generated with the range image sensor 10 (cf. S10 of FIG. 11).

The object detection stage 16 then generates a foreground range image based on the range image, the background range image and the distance threshold value (S11), generates an orthogonal coordinate conversion image from the foreground range image (S12), generates a world coordinate conversion image from the orthogonal coordinate conversion image (S13), and generates a parallel projection image from the world coordinate conversion image (S14). The stage 16 then extracts data (sampling data) of part (outline) of each physical object from the parallel projection image (S15).

At step S16, the object detection stage 16 distinguishes whether or not the physical object corresponding to the sampling data (area and ratio of the outline) is a person based on the reference data (a value or value range with regard to area and ratio of person's reference region). If any physical object is distinguished as a person ("YES" at S16), the stage 16 calculates the number of persons (N1) within the object extraction area A2 at step S17. Also, if none of physical object is distinguished as a person ("NO" at S16), the stage counts zero as N1 at step S18.

The object detection stage 16 also distinguishes whether or not the physical object corresponding to the sampling data (a pattern of the outline) is a person based on the reference data (a pattern of person's reference region) at step S19. If any physical object is distinguished as a person ("YES" at S19), the stage 16 calculates the number of persons (N2) within the object extraction area A2 at step S20. Also, if none of physical object is distinguished as a person ("NO" at S19), the stage counts zero as N2 at step S21.

The tailgate detection stage 17 then distinguishes whether or not N1 and N2 agree with each other (S22). If N1 and N2 agree with each other ("YES" at S22), the stage 17 detects whether or not tailgate occurs based on N1 or N2 at step S23. In addition, otherwise ("NO" at S22), step S30 of FIG. 12 by the object detection stage 16 is proceeded to.

When tailgate is detected as occurring ("YES" at S23), the tailgate detection stage 17 transmits the alarm signal to the control device 4 and the alarm stage 18 until receiving the release signal from the device 4 (S24-S25). Accordingly, the alarm stage 18 gives an alarm. After the tailgate detection stage 17 receives the release signal from the device 4, the tailgate detection device 1 returns to the stand-by mode.

In case that tailgate is not detected as occurring ("NO" at S23), if the tailgate detection stage 17 receives the entry prohibition signal from the control device 4 ("YES" at S26), the tailgate detection device 1 returns to the stand-by mode. In addition, otherwise ("NO" at S26), step S10 is returned to.

At step 30 of FIG. 12, the object detection stage 16 generates a horizontal cross section image from the altitude corresponding to the distance threshold value in the first process. The stage 16 then extracts data (sampling data) of part (outline of cross section) of each physical object from the horizontal cross section image at step S31. At step S32, based on the reference data (a value or value range with regard to cross section of a person's head), the stage distinguishes whether or not part of the physical object corresponding to the sampling data (area of outline) is a person's head, and thereby detects the position of a person's head (M1). Then, if all horizontal cross section images are generated ("YES" at S33), the stage 16 proceeds to step S35 and also otherwise ("NO" at step S33) returns to step S30.

In addition, the object detection stage 16 detects a position of each person's head (M2) based on an intensity image and the prescribed intensity at step S34, and then proceeds to step S35.

At step S35, the object detection stage 16 compares M1 with M2. If both coincide ("YES" at S36), the stage detects a person that stands up straight and has hair on the head at step S37. Otherwise ("NO" at S36), if only M1 is detected ("YES" at S38), the stage 16 detects a person that stands up straight and has no hair on the head at step S39. Otherwise ("NO" at S38), if only M2 is detected ("YES" at S40), the stage 16 detects a person that leans one's head and has hair on the head at step S41. Otherwise ("NO" at S40), the stage 16 does not detect a person at step S42.

The object detection stage 16 then totals the number of persons at step S43 and returns to step S23 of FIG. 11.

In an alternate embodiment, the tailgate detection device 1 is located outside the door 20. In this case, when the input device 3 reads ID information of a ID card to transmit it to the control device 4 in the stand-by mode, the control device 4 activates the tailgate detection device 1. If tailgate condition is occurring outside the door 20, the tailgate detection device 1 transmits the alarm signal to the control device 4 and the alarm stage 18, and the control device 4 keeps lock of the door 20 based on the alarm signal from the tailgate detection device 1 regardless of the ID information of the ID card. Accordingly, tailgate can be prevented. If tailgate condition is not occurring outside the door 20, the control device 4 transmits the unlock control signal to the security device 2. Accordingly, the person carrying the ID card can open the door 20 to enter the room to be managed.

Figure 13:
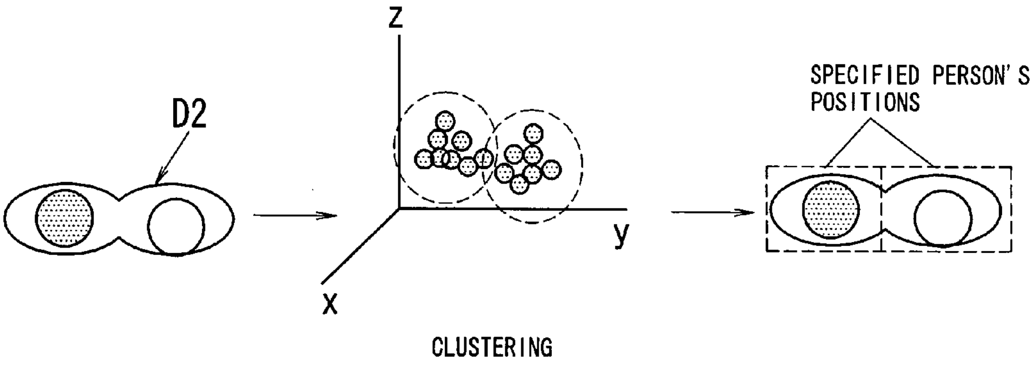
FIG. 13 shows a process of clustering executed by an object detection stage in a second embodiment of a tailgate detection device according to the invention.

FIG. 13 is an explanatory diagram of operation of an object detection stage in a second embodiment of a tailgate detection device according to the invention. The object detection stage of the second embodiment executes a first process to a seventh process as well as those of the first embodiment. And as a characteristic of the second embodiment, after the seventh process, the stage executes clustering task of K-means algorithm when the number of persons N1 calculated in the sixth process is different from the number of persons N2 calculated in the seventh process.

That is, the object detection stage of the second embodiment assigns a position of part of each physical object distinguished as a person in the parallel projection image to component of a cluster based on the number of physical objects distinguished as persons, and then verifies the number of physical objects distinguished as the above persons by K-means algorithm of clustering.

For example, the larger one of N1 and N2 is utilized as an initial value of the number of divisions of clustering. The object detection stage obtains each divided domain by K-means algorithm to calculate area of its divided domain. And when difference between the area of the divided domain and previously recorded area of a person is equal to or less than a prescribed threshold value, the stage calculates by regarding the divided domain as region of a person. When the difference is larger than the prescribed threshold value, the object detection stage increases or decreases the initial value of the number of divisions to execute K-means algorithm again. According to this K-means algorithm, a position of each person can be estimated.

Figure 14:
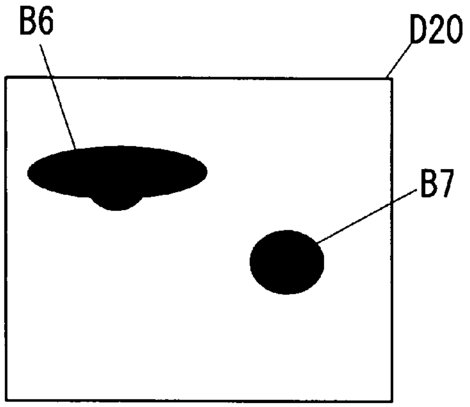
FIG. 14 is an explanatory diagram of operation of an object detection stage in a third embodiment of a tailgate detection device according to the invention.

FIG. 14 is an explanatory diagram of operation of an object detection stage in a third embodiment of a tailgate detection device according to the invention.

As shown in FIG. 14, the object detection stage of the third embodiment extracts a specific image element from each image element of a range image from the range image sensor 10 instead of each process in the first embodiment, and thereby generates a foreground range image D20. The specific image element is extracted when a distance value of an image element of a range image is smaller than a prescribed distance threshold value. Based on the foreground range image D20, the object detection stage separately detects one or more persons as one or more physical objects to be detected in a detection area. In the example of FIG. 14, black sections are formed from image elements each of which has a distance value smaller than the prescribed distance threshold value, while a white portion is formed from image elements each of which has a distance value larger than the prescribed distance threshold value.

In the third embodiment, it is possible to detect physical objects between a position of a range image sensor and a forward position (distance corresponding to the prescribed distance threshold value) away from the sensor. Therefore, when the prescribed distance threshold value is set to a proper value, a state of overlapping of a person with dynamic noise (e.g., a baggage, a cart, etc.) can be distinguished from a state of overlapping of two or more persons. In the example of FIG. 14, it is possible to separately detect region upward from the shoulders of the person B6 and region of the head of the person B7 in the detection area.

Figure 15:
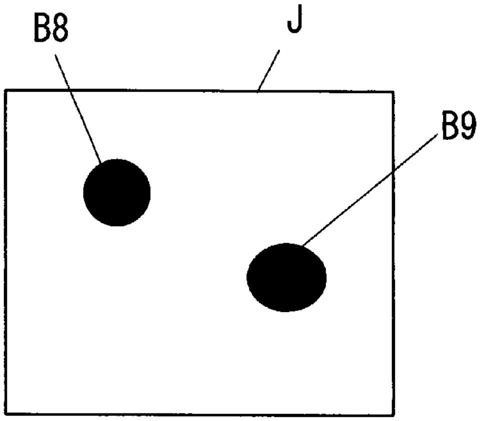
FIG. 15 is an explanatory diagram of operation of an object detection stage in a fourth embodiment of a tailgate detection device according to the invention.

FIG. 15 is an explanatory diagram of operation of an object detection stage in a fourth embodiment of a tailgate detection device according to the invention.

As shown in FIG. 15, the object detection stage of the fourth embodiment generates a distribution image J from each distance value of a range image generated by a range image sensor 10 instead of each process in the first embodiment. And the stage identifies whether or not one or more distribution domains in the distribution image J correspond to data previously recorded based on region of a person to distinguish whether each physical object corresponding to one or more distribution domains in the distribution image J is a person or not, respectively. The distribution image includes one or more distribution domains when one or more physical objects exist in the detection area. The distribution domain is formed from each image element with a distance value lower than a prescribed distance threshold value in the range image. The prescribed distance threshold value is obtained to add a prescribed distance value (e.g., about half value of typical face length) to the minimum value of each distance value of the range image.

In the example of FIG. 15, the distribution image J is a two-value image, wherein black sections are distribution domains, while a white portion is formed from each distance value larger than a specific distance value in the range image. Since the distribution image J is a two-value image, the previously recorded data is area or diameter of outline of a person's region, or a pattern of shape (e.g., a circle or the like) obtained from outline of a person's head in case that pattern matching is utilized.

In the fourth embodiment, since one or more persons' heads to be detected in a detection area are detected, a state of overlapping of a person with dynamic noise (e.g., a baggage, a cart, etc.) can be distinguished from a state of overlapping of two or more persons. In the example of FIG. 15, it is possible to separately detect each head of persons B8 and B9 in the detection area.

Figure 16:
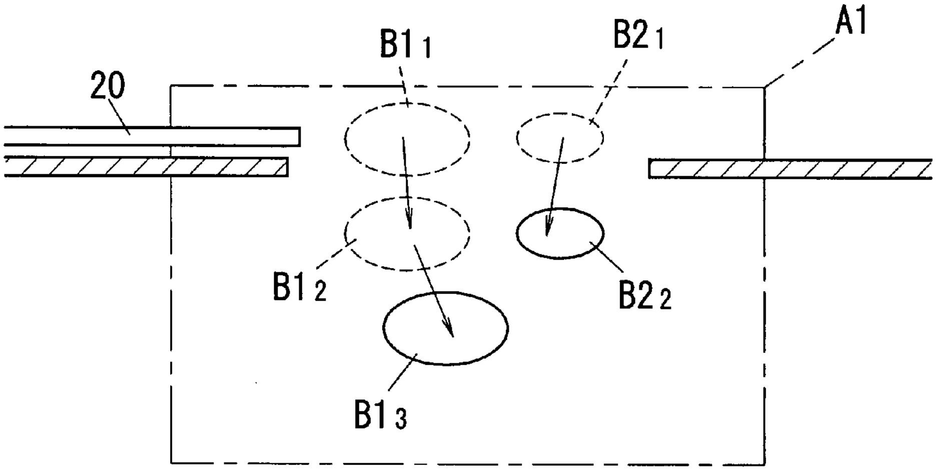
FIG. 16 is an explanatory diagram of operation of a tailgate detection stage in a fifth embodiment of a tailgate detection device according to the invention.

FIG. 16 is an explanatory diagram of operation of a tailgate detection stage in a fifth embodiment of a tailgate detection device according to the invention.

As shown in FIG. 16, the tailgate detection stage of the fifth embodiment separately follows moving tracks of one or more persons detected with the object detection stage on tailgate alert. And when two or more persons move to/from the detection area on prescribed direction, the stage detects occurrence of tailgate to transmit an alarm signal to a control device 4 and an alarm stage 18. In FIG. 16, 20 is an automatic door.

In the fifth embodiment, the prescribed direction is set to the direction to move into the detection area A1 across the border of the detection area A1 in the door 20 side. For example, as shown in FIG. 16, since one person's moving track of $B1_1$, $B1_2$ and $B1_3$ and other person's moving track of $B2_1$ and $B2_2$ alike correspond to the prescribed direction, the alarm signal is transmitted. In this case, each person's moving track can be judged at a point in time $B1_3$ and $B2_2$, and the alarm signal is transmitted at the point in time. In addition, a specified time for tailgate alert (e.g., 2 seconds) is defined based on a time from when the person B1 goes across the door to when the person B2 goes across the door. For example, the specified time can be also set for a time from when the automatic door 20 opens to when it closes.

In the fifth embodiment, when two or more persons move into the detection area A1 across the border of the detection area A1 in the door 20 side, the alarm signal is transmitted and therefore the tailgate can be immediately detected. In addition, even if plural persons are detected, the alarm signal is not transmitted when two or more persons do not move to the detection area on the prescribed direction, and therefore a false alarm can be prevented.

In an alternate embodiment, the tailgate detection device 1 is located outside the door 20. In this case, the prescribed direction is set to the direction to move from the detection area to the border of the detection area in the door 20 side.

Figure 17:
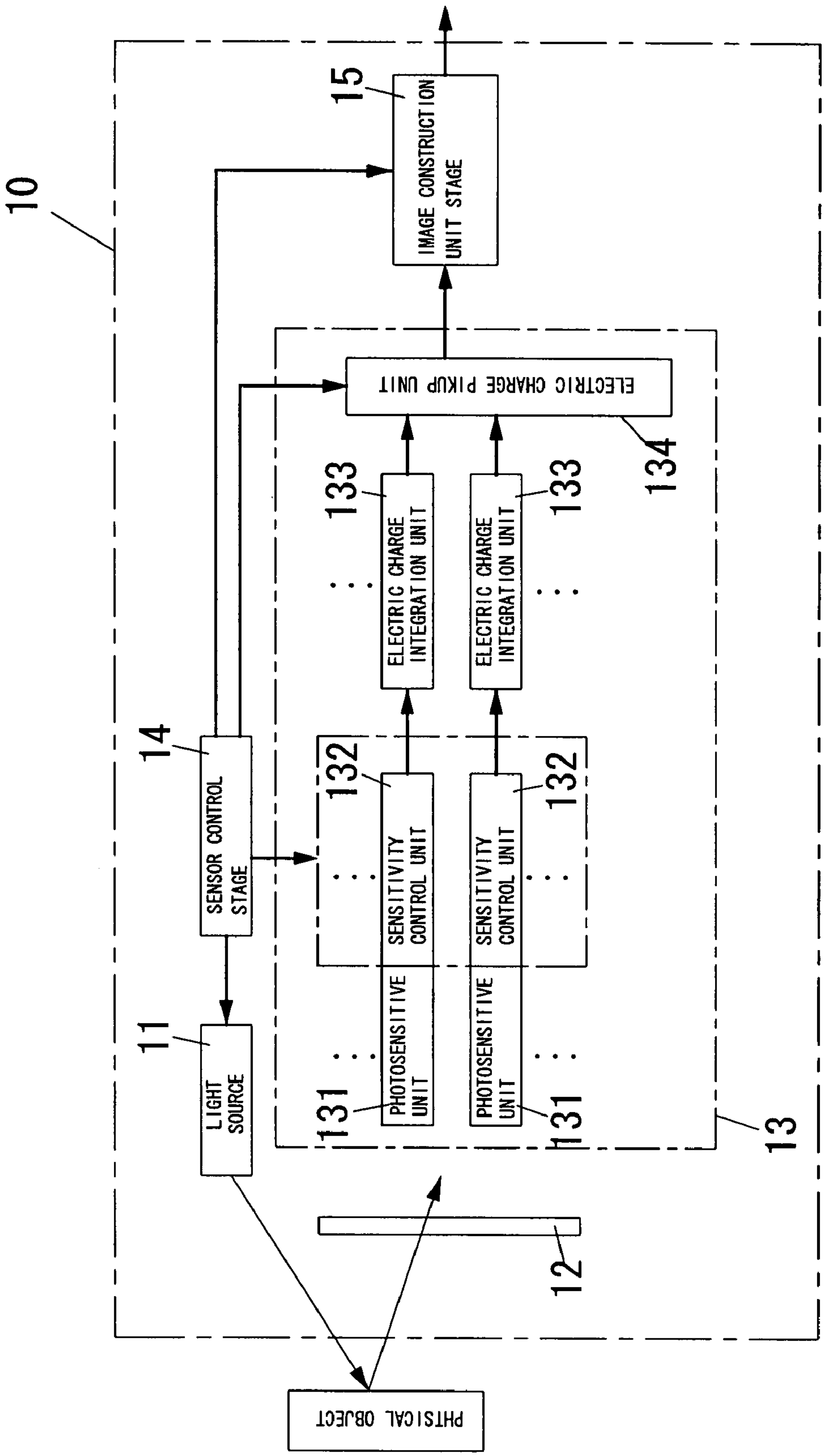
FIG. 17 is a structure diagram of a range image sensor in a sixth embodiment of a tailgate detection device according to the invention.

FIG. 17 shows a range image 10 sensor in a sixth embodiment of a tailgate detection device according to the invention. The range image sensor 10 sensor of the sixth embodiment comprises a light source 11, an optical system 12, a light detecting element 13, a sensor control stage 14 and an image construction stage 15, and can be utilized in the above each embodiment.

Figure 18:
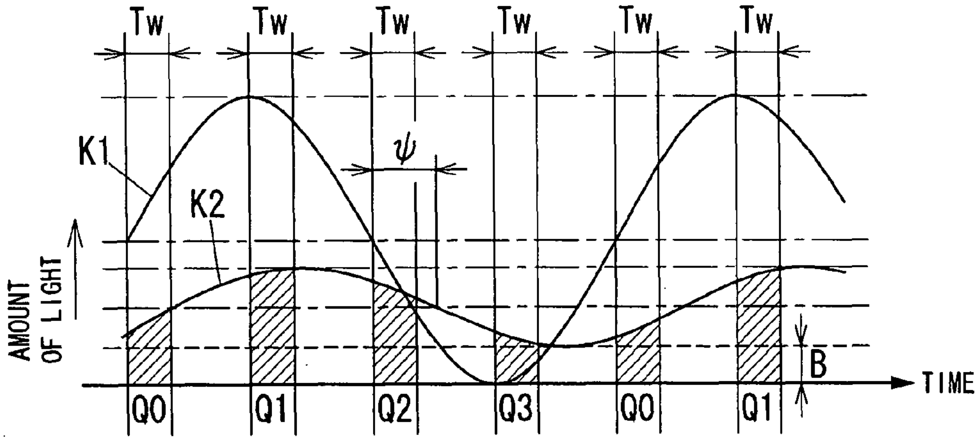
FIG. 18 is an explanatory diagram of operation of the range image sensor of FIG. 17.

In order to secure light intensity, the light source 11 is constructed with, for example, an infrared LED array arranged on a plane, a semiconductor laser and a divergent lens, or the like. As shown in FIG. 18, the source modulates intensity K1 of infrared light so that it changes periodically at a constant period according to a modulation signal from the sensor control stage 14, and then emits intensity-modulated infrared light to a detection area. However, intensity waveform of the intensity-modulated infrared light is not limited to sinusoidal waveform, but may be a shape such as a triangular wave, saw tooth wave or the like.

The optical system 12 is a receiving optical system and is constructed with, for example, a lens, an infrared light transmission filter and so on. And the system condenses infrared light from the detection area into a receiving surface (each photosensitive unit 131) of the light detecting element 13. For example, the system 12 is disposed so as to orthogonalize its optical axis and the receiving surface of the light detecting element 13.

The light detecting element 13 is formed in a semiconductor device and includes photosensitive units 131, sensitivity control units 132, electric charge integration units 133 and a electric charge pickup unit 134. Each photosensitive unit 131, each sensitivity control unit 132 and each electric charge integration unit 133 constitute a two-dimensional photosensitive array as the receiving surface disposed to face the detection area via the optical system 12.

Figure 19A:
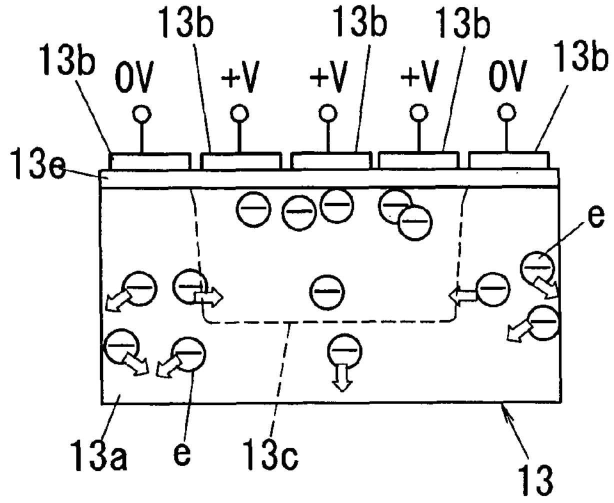
FIG. 19A shows a domain corresponding one photosensitive portion in the range image sensor of FIG. 17.
Figure 19B:
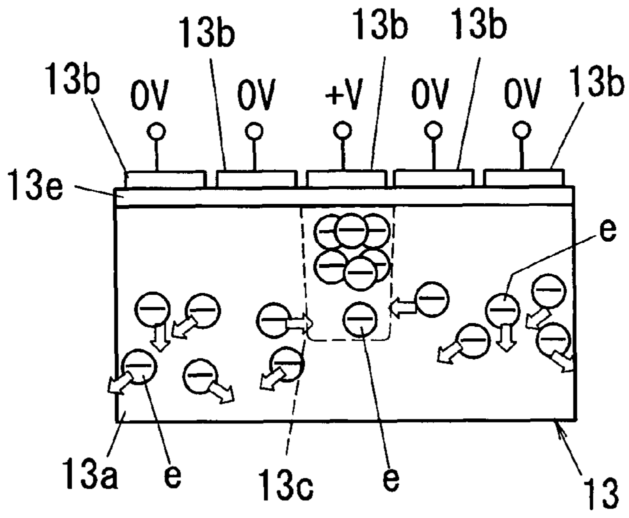
FIG. 19B shows a domain corresponding one photosensitive portion in the range image sensor of FIG. 17.

As shown in FIGS. 19A and 19B, each photosensitive unit 131 is formed as a photosensitive element of, for example, a 100×100 two-dimensional photosensitive array by an impurity doped semiconductor layer 13*a* in a semiconductor substrate. The unit 131 generates an electric charge of quantity in response to an amount of infrared light from the detection area at the photosensitivity-sensitivity controlled by a corresponding sensitivity control unit 132. For example, the semiconductor layer 13*a* is n-type and the generated electric charge is derived from electrons.

When the optical axis of the optical system 12 is at right angles to the receiving surface, if the optical axis and both axes of vertical (length) direction and horizontal (breadth) direction of the receiving surface are set to three axes of an orthogonal coordinates system and also the origin is set to the center of the system 12, each photosensitive unit 131 then generates an electric charge of quantity in response to an amount of light from direction indicated by angles of azimuth and elevation. When one or more physical objects exist in the detection area, the infrared light emitted from the light source 11 is reflected at the physical objects and then received by photosensitive units 131. Accordingly, a photosensitive unit 131 receives the intensity modulated infrared light delayed by the phase Ψ corresponding to the out and return distance between itself and an physical object as shown in FIG. 18 and then generates an electric charge of quantity in response to its intensity K2. The intensity modulated infrared light is represented by $$K2\cdot\sin(\omega t-\psi)+B, \qquad \text{(eq. 1)}$$

where ω is an angular frequency and B is ambient light component.

The sensitivity control unit 132 is constructed with control electrodes 13*b* layered on a surface of the semiconductor layer 13*a* through an insulation film (oxide film) 13*e*. And the unit 132 controls the sensitivity of a corresponding photosensitive unit 131 according to a sensitivity control signal from the sensor control stage 14. In FIGS. 19A and 19B, the width size of the control electrode 13B on right and left direction is set to about 1 μm. The control electrodes 13B and the insulation film 13*e* are formed of materials with translucency with respect to infrared light of the light source 11. As shown in FIGS. 19A and 19B, the sensitivity control unit 132 is constructed of a plurality of (e.g., five) control electrodes with respect to a corresponding photosensitive unit 131. For example, when the generated electric charge is derived from electrons, voltage (+V, 0V) is applied to each control electrode 13B as the sensitivity control signal.

The electric charge integration unit 133 is comprised of a potential well (depletion layer) 13*c* changing in response to the sensitivity control signal applied to corresponding each control electrode 13*b*. And the unit 133 captures and integrates electrons (e) in proximity to the potential well 13*c*. Electrons not integrated in the electric charge integration unit 133 disappear by recombination with holes. Therefore, by changing region size of the potential well 13*c* through the sensitivity control signal, it is possible to control the photosensitivity-sensitivity of the light detecting element 13. For example, the sensitivity in a state of FIG. 19A is higher than that in a state of FIG. 19B.

Figure 20:
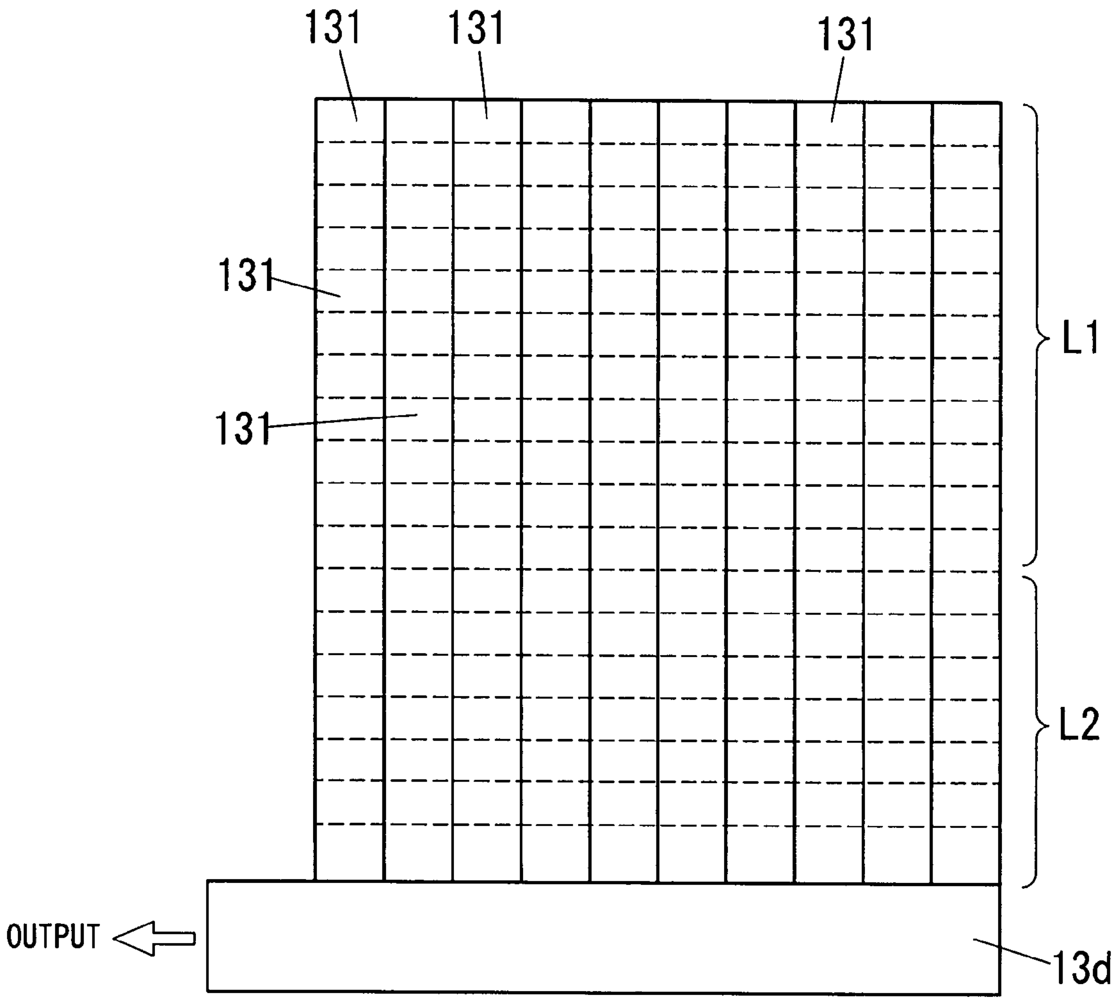
FIG. 20 is an explanatory diagram of an electric charge pickup unit in the range image sensor of FIG. 17.

For example, as shown in FIG. 20, the electric charge pickup unit 134 has a similar structure to a CCD image sensor of frame transfer (FT) type. In an image pickup region L1 formed of photosensitive units 131 and a light-shielded storage region L2 next to the region L1, a semiconductor layer 13*a* continuing integrally on each vertical (length) direction is used as a transfer path of electric charge along the vertical direction. The vertical direction corresponds to the right and left direction of FIGS. 19A and 19B.

The electric charge pickup unit 134 is constructed with the storage region L2, each transfer path, and a horizontal transfer part 13*d* that is a CCD and receives an electric charge from one end of each transfer path to transfer each electric charge along horizontal direction. Transfer of electric charge from the image pickup region L1 to the storage region L2 is executed at one time during a vertical blanking period. That is, after electric charges are integrated in potential wells 13*c*, a voltage pattern different from a voltage pattern of the sensitivity control signal is applied to each control electrode 13*b* as a vertical transfer signal, so that electric charges integrated in the potential wells 13*c* are transferred along the vertical direction. As to transfer from the horizontal transfer part 13*d* to the image construction stage 15, a horizontal transfer signal is supplied to the horizontal transfer part 13*d* and electric charges of one horizontal line are transferred during a horizontal period. In an alternate example, the horizontal transfer part transfers electric charges along normal direction to the planes of FIGS. 19A and 19B.

The sensor control stage 14 is an operation timing control circuit and controls operation timing of the light source 11, each sensitivity control unit 132 and the electric charge pickup unit 134. That is, since a transmission time of light for the above out and return distance is an extremely short time such as nanosecond level, the sensor control stage 14 provides the light source 11 with the modulation signal of a specific modulation frequency (e.g., 20 MHz) to control change timing of the intensity of the intensity-modulated infrared light.

The sensor control stage 14 also applies each control electrode 13*b* with voltage (+V, 0V) as the sensitivity control signal and thereby changes the sensitivity of the light detecting element 13 to high sensitivity or low sensitivity.

Further, the sensor control stage 14 supplies each control electrode 13*b* with the vertical transfer signal during the vertical blanking period, and supplies the horizontal transfer part 13*d* with the horizontal transfer signal during one horizontal period.

The image construction stage 15 is constructed with, for example, a CPU, a storage device for storing a program and so on, etc. And the stage 15 constructs the range image and the intensity image based on the signals from the light detecting element 13.

Operation principle of the sensor control stage 14 and the image construction stage 15 is now explained. The phase (phase difference) Ψ of FIG. 18 corresponds to out and return distance between the receiving surface of the light detecting element 13 and a physical object in the detection area. Therefore, by calculating the phase Ψ, it is possible to calculate distance up to the physical object. The phase Ψ can be calculated from time integration values (e.g., integration values Q0, Q1, Q2 and Q3 in periods TW) of a curve indicated by the above (Eq. 1). The time integration values (quantities of light received) Q0, Q1, Q2 and Q3 take start points of phases 0°, 90°, 180° and 270°, respectively. Instantaneous values q0, q1, q2 and q3 of Q0, Q1, Q2 and Q3 are respectively given by $$\begin{aligned} q0 &= K2\cdot\sin(-\Psi)+B \\ &= -K2\cdot\sin(\Psi)+B, \\ q1 &= K2\cdot\sin(\Pi/2-\Psi)+B \\ &= K2\cdot\cos(\Psi)+B, \\ q2 &= K2\cdot\sin(\Pi-\Psi)+B \\ &= K2\cdot\sin(\Psi)+B, \text{ and} \\ q3 &= K2\cdot\sin(3\Pi/2-\Psi)+B \\ &= -K2\cdot\cos(\Psi)+B. \end{aligned}$$

Therefore, the phase Ψ is given by the following (Eq. 2), and also in case of the time integration values, the phase Ψ can be obtained by (Eq. 2).

$$\Psi=\tan^{-1}\{(q2-q0)/(q1-q3)\} \quad \text{(Eq. 2)}$$

During one period of the intensity-modulated infrared light, an electric charge generated in the photosensitive unit 131 is few, and therefore the sensor control stage 14 controls the sensitivity of the light detecting element 13 to integrate an electric charge generated in the photosensitive unit 131 during periods of the intensity-modulated infrared light into the electric charge integration unit 133. The phase Ψ and reflectance of the physical object are not almost changed in the periods of the intensity-modulated infrared light. Therefore, for example, when an electric charge corresponding to the time integration value Q0 is integrated into the electric charge integration unit 133, the sensitivity of the light detecting element 13 is raised during the term corresponding to Q0, while the sensitivity of the light detecting element 13 is lowered during a period of time in which the term is excluded.

In case the photosensitive unit 131 generates an electric charge in proportion to the amount of received light, when the electric charge integration unit 133 integrates an electric charge of Q0, the electric charge proportional to αQ0+β(Q1+Q2+Q3)+βQx is integrated, where α is the sensitivity in the terms corresponding to Q0 to Q3, β is the sensitivity in a period of time in which the terms are excluded, and Qx is an amount of light received in a period of time in which the terms for obtaining Q0, Q1, Q2 and Q3 are excluded. Similarly, when the electric charge integration unit 133 integrates an electric charge of Q2, an electric charge proportional to αQ2+β(Q0+Q1+Q3)+βQx is integrated. Owing to Q2−Q0=(α−β)(Q2−Q0) and Q1−Q3=(α−β)(Q1−Q3), (Q2−Q0)/(Q1−Q3) becomes the same value in theory from (eq. 2) regardless of whether or not an unwanted electric charge is mixed. Therefore, even if an unwanted electric charge is mixed, a phase Ψ to be calculated becomes the same value.

After a period of time corresponding to the periods of the intensity-modulated. infrared light, in order to pick up an electric charge integrated in each electric charge integration unit 133 the sensor control stage 14 supplies the vertical transfer signal to each control electrode 13B for the vertical blanking period, and supplies the horizontal transfer signal to the horizontal transfer part 13*d* for one horizontal period.

In addition, since Q0−Q3 represents the brightness of the physical object, an additional value or an average value of Q0–Q3 corresponds to an intensity (concentration) value in the intensity image (gray image) of the infrared light. Therefore, the image construction stage 15 can construct a range image and an intensity image from Q0–Q3. Moreover, by constructing the range image and the intensity image from Q0–Q3, it is possible to obtain the distance value and the intensity value at the same position. The image construction stage 15 calculates a distance value from Q0–Q3 by means of (eq. 2) and constructs the range image from each distance value. In this case, it may calculate three-dimensional information of the detection area from each distance value to construct the range image from the three-dimensional information. Since the intensity image includes the average value of Q0–Q3 as the intensity value, it is possible to eliminate the influence of light from the light source 11.

Figure 21:
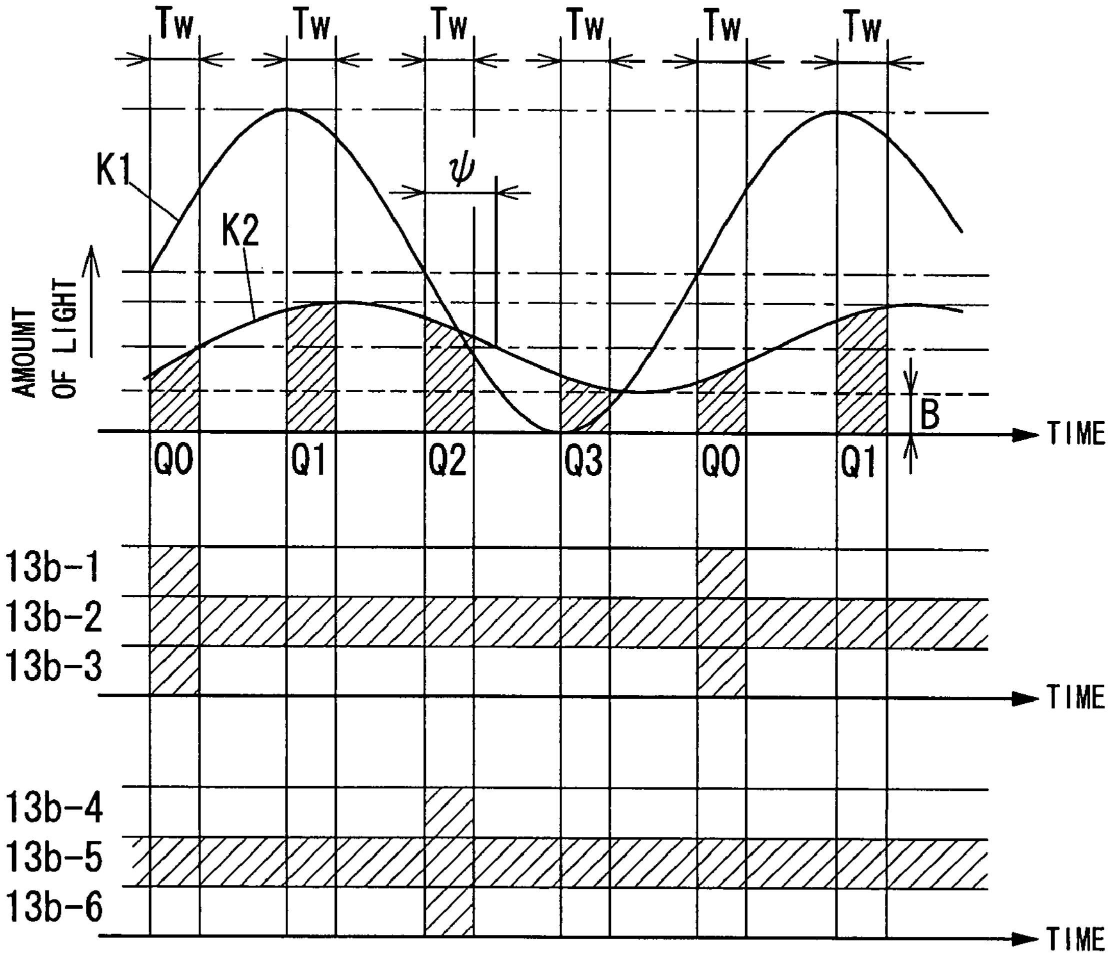
FIG. 21 is an explanatory diagram of operation of a range image sensor in a seventh embodiment of a tailgate detection device according to the invention.

FIG. 21 is an explanatory diagram of operation of a range image sensor in a seventh embodiment of a tailgate detection device according to the invention.

As a contrast with the range image sensor of the sixth embodiment, the range image sensor of the seventh embodiment utilizes two photosensitive units as one pixel and generates two kinds of electric charges corresponding to Q0–Q3 within one period of the modulation signal.

If electric charges corresponding to Q0–Q3 are generated in one photosensitive unit 131, resolution concerning direction of line of vision becomes high but a problem of a time lag occurs, whereas if electric charges corresponding to Q0–Q3 are generated in four photosensitive units, a time lag becomes small but resolution concerning direction of line of vision becomes low.

Figure 22A:
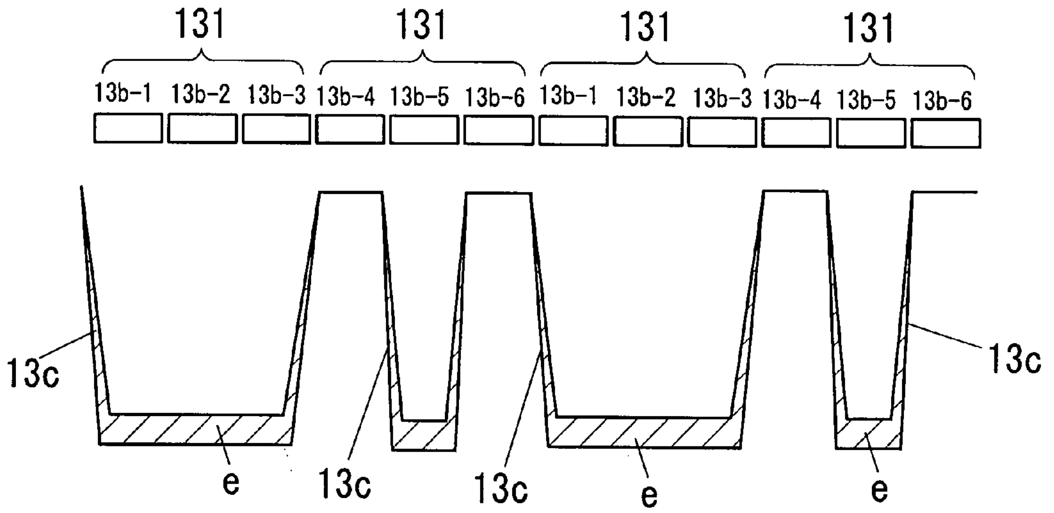
FIG. 22A is an explanatory diagram of operation of the range image sensor of FIG. 21.
Figure 22B:
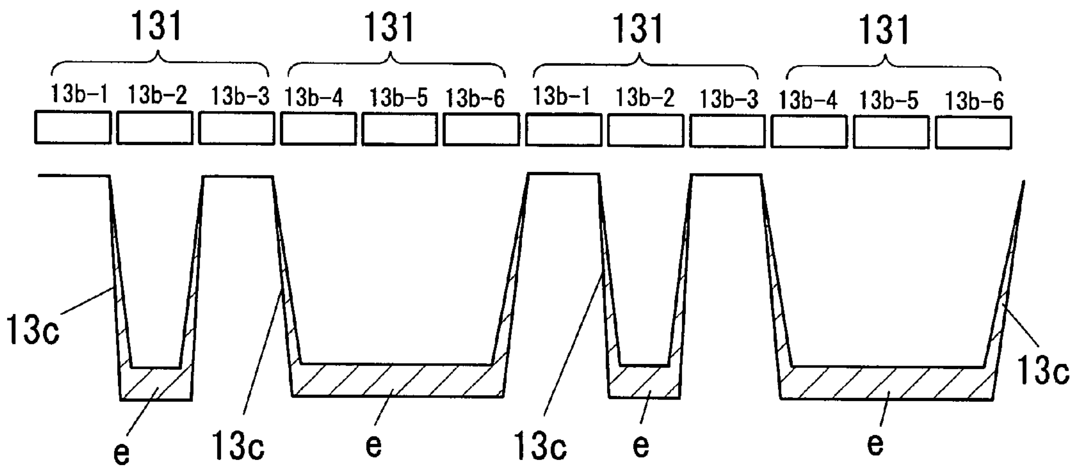
FIG. 22B is an explanatory diagram of operation of the range image sensor of FIG. 21.

In the seventh embodiment, as shown in FIGS. 22A and 22B, two photosensitive units are utilized as one pixel in order to solve the problems. In FIGS. 19A and 19B of the sixth embodiment, while an electric charge is generated in the photosensitive unit 131, the two control electrodes of the both sides function as forming potential barriers for preventing the electric charge from flowing out to the neighboring photosensitive units 131. In the seventh embodiment, since a barrier is formed between potential wells of neighboring photosensitive units 131 by means of any photosensitive unit 131, three control electrodes are provided with respect to each photosensitive unit so that six control electrodes 13*b*-1, 13*b*-2, 13*b*-3, 13*b*-4, 13*b*-5 and 13*b*-6 are provided with respect to one unit.

The operation of the seventh embodiment is now explained. In FIG. 22A, the voltage of +V (prescribed positive voltage) is applied to each of the control electrodes 13*b*-1, 13*b*-2, 13*b*-3 and 13*b*-5, and the voltage of 0V is applied to each of the control electrodes 13*b*-4 and 13*b*-6. In FIG. 22B, the voltage of +V is applied to each of the control electrodes 13*b*-2, 13*b*-4, 13*b*-5 and 13*b*-6, and the voltage of 0V is applied to each of the control electrodes 13*b*-1 and 13*b*-3. These voltage patterns are alternately changed whenever the phase of the modulation signal shifts to reverse phase (180°). Also, in other period of time, the voltage of +V is applied to each of the control electrodes 13*b*-2 and 13*b*-5, and the voltage of 0V is applied to each remaining control electrode. Accordingly, for example, as shown in FIG. 21, the light detecting element can generate an electric charge corresponding to Q0 through the voltage pattern of FIG. 22A, and generate an electric charge corresponding to Q2 through the voltage pattern of FIG. 22B. In addition, since the voltage of +V is always applied to each of the control electrodes 13*b*-2 and 13*b*-5, an electric charge corresponding to Q0 and an electric charge corresponding to Q2 are integrated and held. Similarly, if both voltage patterns of FIGS. 22A and 22B are utilized and applying timing of the both voltage patterns is shifted by 90°, an electric charge corresponding to Q1 and an electric charge corresponding to Q3 can be integrated and held.

Electric charges are transferred from the image pickup region L1 to the storage region L2 between the term for generating electric charges corresponding to Q0 and Q2 and the term for generating electric charges corresponding to Q1 and Q3. That is, when an electric charge corresponding to Q0 is stored in a potential well 13*c* corresponding to control electrodes 13*b*-1, 13*b*-2 and 13*b*-3 and also an electric charge corresponding to Q2 is stored in a potential well 13*c* corresponding to control electrodes 13*b*-4, 13*b*-5 and 13*b*-6, electric charges corresponding to Q0 and Q2 are picked up. And then, when an electric charge corresponding to Q1 is stored in a potential well 13*c* corresponding to control electrodes 13*b*-1, 13*b*-2 and 13*b*-3 and also an electric charge corresponding to Q3 is stored in a potential well 13*c* corresponding to control electrodes 13*b*-4, 13*b*-5 and 13*b*-6, electric charges corresponding to Q1 and Q3 are picked up. By repeating such operation, electric charges corresponding to Q0–Q3 can be picked up through two readout operations, and phase Ψ can be calculated by utilizing the picked up electric charges. For example, when images are required at 30 frames per second, a sum term of the term for generating electric charges corresponding to Q0 and Q2 and the term for generating electric charges corresponding to Q1 and Q3 becomes a period of time shorter than one sixtieth of a second.

Figure 23A:
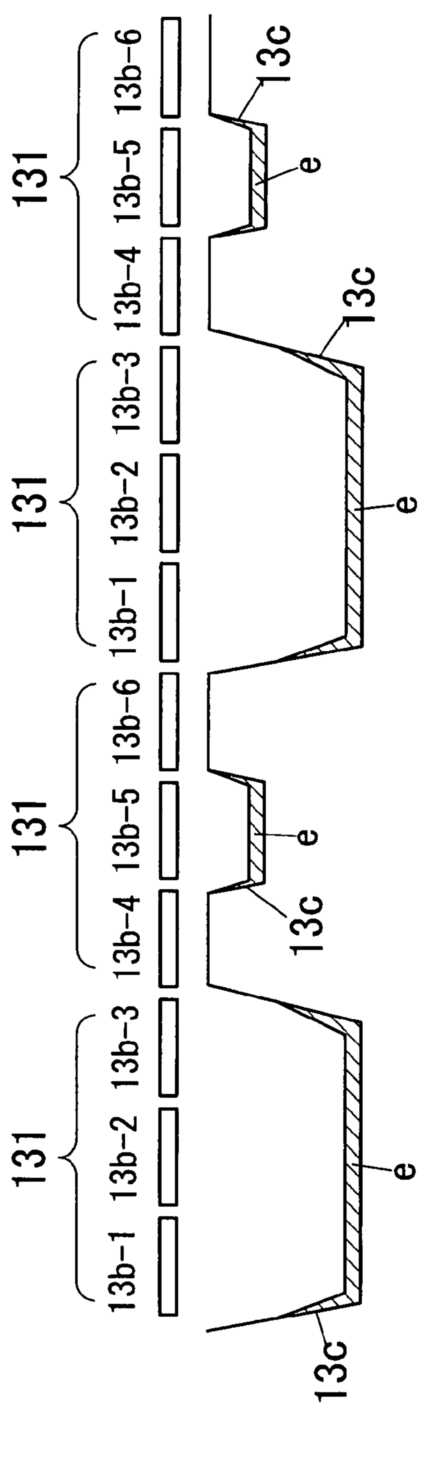
FIG. 23A shows an alternate embodiment of the range image sensor of FIG. 21.
Figure 23B:
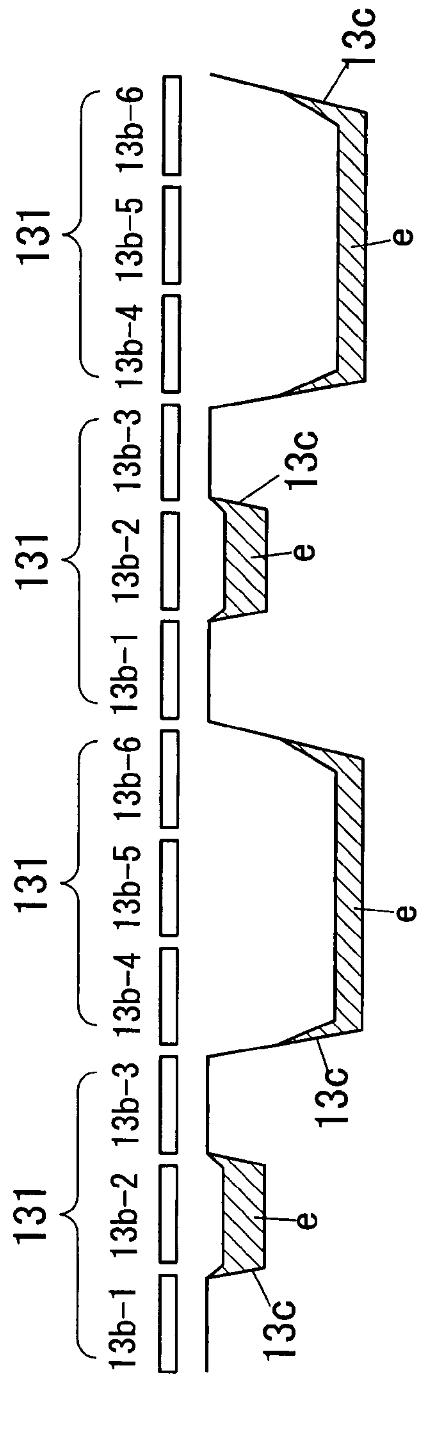
FIG. 23B shows an alternate embodiment of the range image sensor of FIG. 21.

In an alternate embodiment, as shown in FIG. 23A, the voltage of +V is applied to each of control electrodes 13*b*-1, 13*b*-2 and 13*b*-3, and voltage between +V and 0V is applied to a control electrode 13*b*-5, and the voltage of 0V is applied to each of control electrodes 13*b*-4 and 13*b*-6. On the other hands, as shown in FIG. 23B, voltage between +V and 0V is applied to a control electrode 13*b*-2, and the voltage of +V is applied to each of control electrodes 13*b*-4, 13*b*-5 and 13*b*-6, and the voltage of 0V is applied to each of control electrodes 13*b*-1 and 13*b*-3. Thus, a potential well for mainly generating an electric charge is made deeper than a potential well for mainly holding an electric charge, and thereby an electric charge generated in a region corresponding to each control electrode applying the voltage of 0V easily flows into the deeper potential well. Therefore, it is possible to reduce noise component flowing into a potential well that holds an electric charge.

Although the present invention has been described with reference to certain preferred embodiments, numerous modifications and variations can be made by those skilled in the art without departing from the true spirit and scope of this invention.

For example, in the sixth and seventh embodiments, similar construction to interline transfer (IT) or frame interline transfer (FIT) type may be utilized in stead of the similar construction to the CCD image sensor of FT type.

The invention claimed is:

1. An individual detector, comprising:

a range image sensor that is disposed to face downward to a detection area below and generates a range image, each image element of the range image including, when one or more physical objects exist in said area, each distance value up to the one or more physical objects, respectively; and an object detection stage that separately detects the one or more physical objects in said area based on the range image generated with said sensor, wherein said object detection stage generates a foreground range image by extracting a specific image element from each image element of a present range image, the specific image element being extracted when a distance differential is larger than a prescribed distance threshold value, the distance differential being obtained by subtracting an image element of said present range image from a corresponding image element of a background range image, wherein the background range image is a range image previously obtained from said sensor, wherein said object detection stage separately detects one or more persons as the one or more physical objects to be detected in said area based on the foreground range image, wherein said object detection stage detects one or more physical objects to be detected in said area based on data of part of a specific, or each, altitude of the one or more physical objects to be detected, the data being obtained from said range image, generates a foreground range image by extracting a specific image element from each image element of said range image, and separately detects one or more persons as one or more physical objects to be detected in said area based on the foreground range image, and said specific image element is extracted when a distance value of an image element of said range image is smaller than a prescribed distance threshold value.

2. The individual detector of claim 1, wherein:

said range image sensor has a camera structure constructed with an optical system and a two-dimensional photosensitive array disposed to face said detection area via the optical system; and said object detection stage converts a camera coordinate system of said foreground range image depending on said camera structure into an orthogonal coordinate system based on camera calibration data previously recorded with respect to said range image sensor, and thereby generates an orthogonal coordinate conversion image that represents each position of presence or lack of presence of said physical objects.

3. The individual detector of claim 2, wherein said object detection stage converts the orthogonal coordinate system of said orthogonal coordinate conversion image into a world coordinate system virtually set on the real space, and thereby generates a world coordinate conversion image that represents each position of presence or lack of presence of said physical objects as actual position and actual dimension.

4. The individual detector of claim 3, wherein said object detection stage projects said world coordinate conversion image on a prescribed plane by parallel projection to generate a parallel projection image constituted of each image element seen from said plane in said world coordinate conversion image.

5. The individual detector of claim 3, wherein said object detection stage extracts sampling data corresponding to part in each altitude of one or more physical objects from said world coordinate conversion image, and identifies whether or not each data corresponds to reference data previously recorded based on region of a person to distinguish whether each physical object corresponding to the sampling data is a person or not, respectively.

6. The individual detector of claim 4, wherein said object detection stage extracts sampling data corresponding to part of one or more physical objects from said parallel projection image, and identifies whether or not the data corresponds to reference data previously recorded based on region of a person to distinguish whether each physical object corresponding to the sampling data is a person or not, respectively.

7. The individual detector of claim 5, wherein:

said sampling data comprises volume or ratio of width, depth and height of part of one or more physical objects virtually represented in said world coordinate conversion image; and said reference data is previously recorded based on region of one or more persons, the reference data being a value or value range with regard to volume or ratio of width, depth and height of said region.

8. The individual detector of claim 6, wherein:

said sampling data comprises area or ratio of width and depth of part of one or more physical objects virtually represented in said parallel projection image; and said reference data is previously recorded based on region of one or more persons, the reference data being a value or value range with regard to area or ratio of width and depth of said region.

9. The individual detector of claim 5, wherein:

said sampling data comprises three-dimensional pattern of part of one or more physical objects virtually represented in said world coordinate conversion image; and said reference data is at least one three-dimensional pattern previously recorded based on region of one or more persons.

10. The individual detector of claim 1, wherein:

said sampling data comprises two-dimensional pattern of part of one or more physical objects virtually represented in said parallel projection image; and said reference data is at least one two-dimensional pattern previously recorded based on region of one or more persons.

11. The individual detector of claim 2, wherein:

said range image sensor further comprises a light source that emits intensity-modulated light toward said detection area, the sensor generating an intensity image in addition to said range image based on received light intensity per image element; and said object detection stage extracts sampling data corresponding to part of one or more physical objects based on said orthogonal coordinate conversion image, and distinguishes whether or not there is a lower part than prescribed intensity at part of each physical object corresponding to said sampling data based on said intensity image.

12. The individual detector of claim 3, wherein:

said range image sensor further comprises a light source that emits intensity-modulated infrared light toward said detection area, the sensor generating an intensity image of said infrared light in addition to said range image based on said infrared light from said area; and said object detection stage extracts sampling data corresponding to part of one or more physical objects based on said world coordinate conversion image, and identifies whether or not average intensity of said infrared light from part of each physical object corresponding to said sampling data is lower than prescribed intensity based on said intensity image to distinguish whether part of each physical object corresponding to the sampling data is a person's head or not, respectively.

13. The individual detector of claim 5, wherein said object detection stage assigns position of part of each physical object distinguished as a person in said parallel projection image to component of a cluster based on the number of physical objects distinguished as persons, and then verifies said number of physical objects based on divided domains obtained by K-means algorithm of clustering.

14. The individual detector of claim 6, wherein said object detection stage assigns position of part of each physical object distinguished as a person in said parallel projection image to component of a cluster based on the number of physical objects distinguished as persons, and then verifies said number of physical objects based on divided domains obtained by K-means algorithm of clustering.

15. The individual detector of claim 1, said object detection stage identifies whether or not a range image around an image element with a minimum value of distance value distribution of said range image corresponds to a specific shape and size of the specific shape previously recorded based on region of a person, and then distinguishes whether each physical object corresponding to the range image around the image element with said minimum value is a person or not, respectively.

16. The individual detector of claim 1, wherein:

said object detection stage generates a distribution image from each distance value of said range image, and separately detects one or more physical objects in said detection area based on the distribution image, said distribution image including one or more distribution domains when one or more physical objects exist in said detection area, said distribution domain being formed from each image element with a distance value lower than a prescribed distance threshold value in said range image, said prescribed distance threshold value being obtained to add a prescribed distance value to a minimum value of each distance value of said range image.

17. A tailgate detection device, comprising the individual detector of claim 1 and a tailgate detection stage, wherein:

said range image sensor continuously generates said range image; and said tailgate detection stage: separately follows moving tracks of one or more persons detected with said object detection stage on tailgate alert; and detects occurrence of tailgate to transmit an alarm signal when two or more persons move to or from said detection area on prescribed direction.

18. A tailgate detection device, comprising the individual detector of claim 1 and a tailgate detection stage, wherein:

said range image sensor continuously generates said range image; and said tailgate detection stage: monitors entry and exit of one or more persons detected with said object detection stage and each direction of the entry and exit; and detects occurrence of tailgate to transmit an alarm signal when two or more persons move to or from said detection area on prescribed direction within a prescribed time set for tailgate guard.

* * * * *